United States Patent [19]

Fleming, III et al.

[11] Patent Number: 4,627,075
[45] Date of Patent: Dec. 2, 1986

[54] METHOD OF IDENTIFYING POSSIBLE VALID DATA PULSES IN A POSITION CODED PULSE TRAIN

[75] Inventors: Robert F. Fleming, III; Raymond F. Irby, both of Vienna, Va.

[73] Assignee: Vega Precision Laboratories, Inc., Vienna, Va.

[21] Appl. No.: 543,404

[22] Filed: Oct. 19, 1983

[51] Int. Cl.[4] .............................................. H03K 7/04
[52] U.S. Cl. ..................................... 375/23; 329/107; 307/234
[58] Field of Search .......................... 375/23; 307/234; 329/107; 370/8, 10; 340/825.64; 343/17.1 R, 17.1 PF

[56] References Cited

U.S. PATENT DOCUMENTS

| | | | |
|---|---|---|---|
| 4,020,477 | 4/1977 | Holland | 375/23 |
| 4,070,550 | 1/1978 | Miller, Jr. et al. | 375/23 |
| 4,083,007 | 4/1978 | Levine | 375/23 |
| 4,088,831 | 5/1978 | Butcher et al. | 375/23 |
| 4,242,664 | 12/1980 | Lindstedt et al. | 375/23 |

*Primary Examiner*—Robert L. Griffin
*Assistant Examiner*—Stephen Chin
*Attorney, Agent, or Firm*—Banner, Birch, McKie & Beckett

[57] ABSTRACT

Pulse position coding is used to transmit several channels of data from a ground radar transmitter to a receiver in an airborne, remotely-piloted vehicle. The system is designed to ignore interfering pulses, especially those which are synchronized with the transmitter's PRF, by combining a number of noise reduction devices. These include the redundant transmission of address and channel information, the transmission of true and complemented data, the tracking of channels transmitted in a predetermined order, developing an interference count to recognize synchronous pulses, comparing data received for a given channel with data subsequently received for that channel, the use of windows around the expected positions of pulses, and the use of parity. There is also a novel programming arrangement which enables several programs to be stored in a reduced amount of memory space.

2 Claims, 31 Drawing Figures

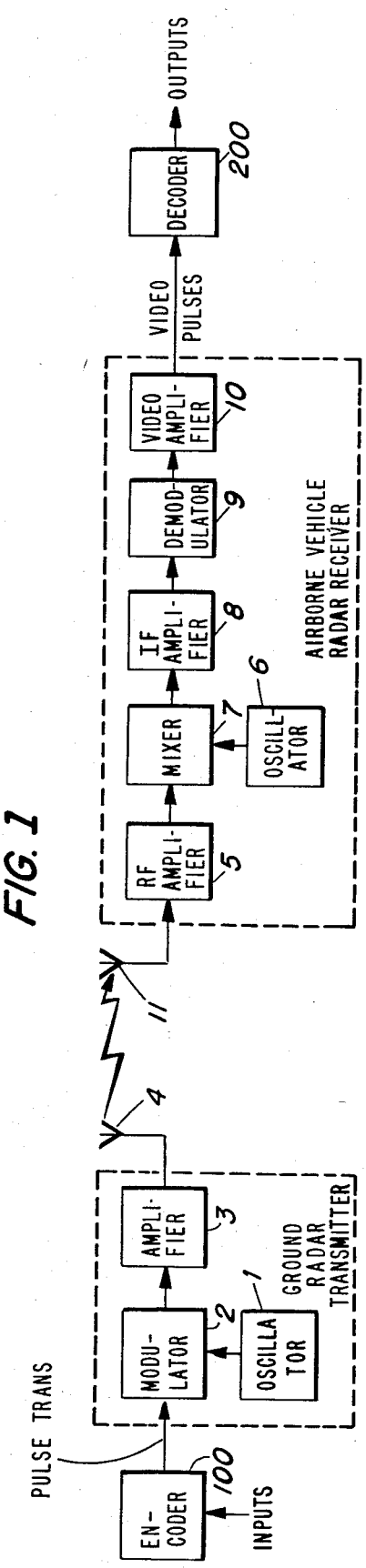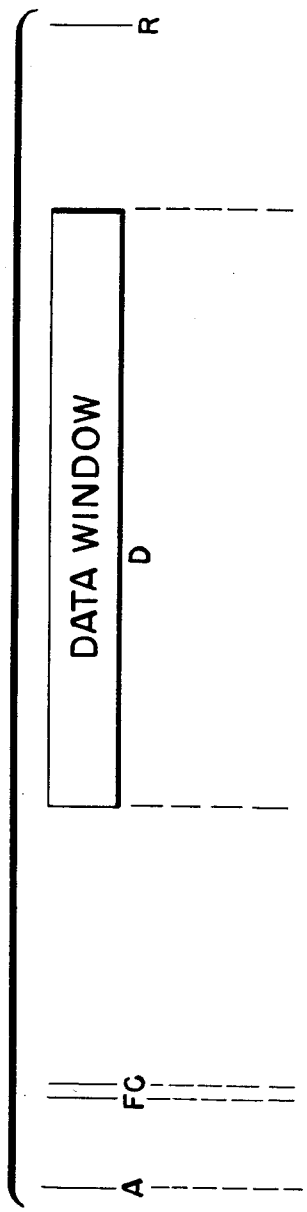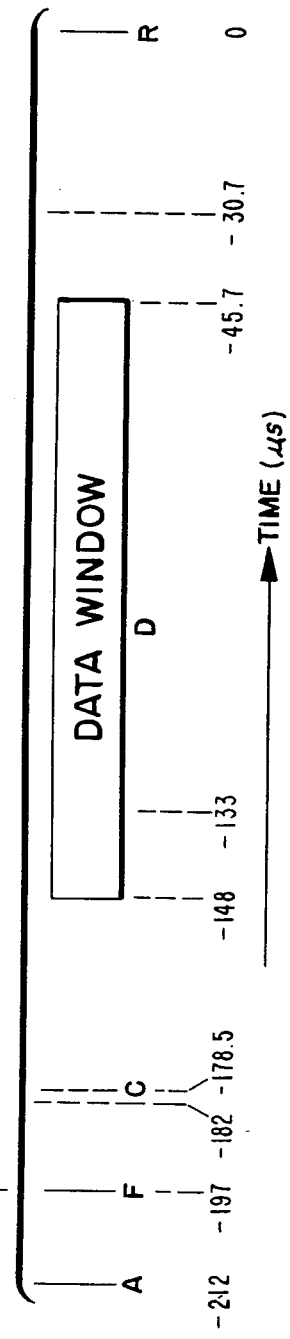

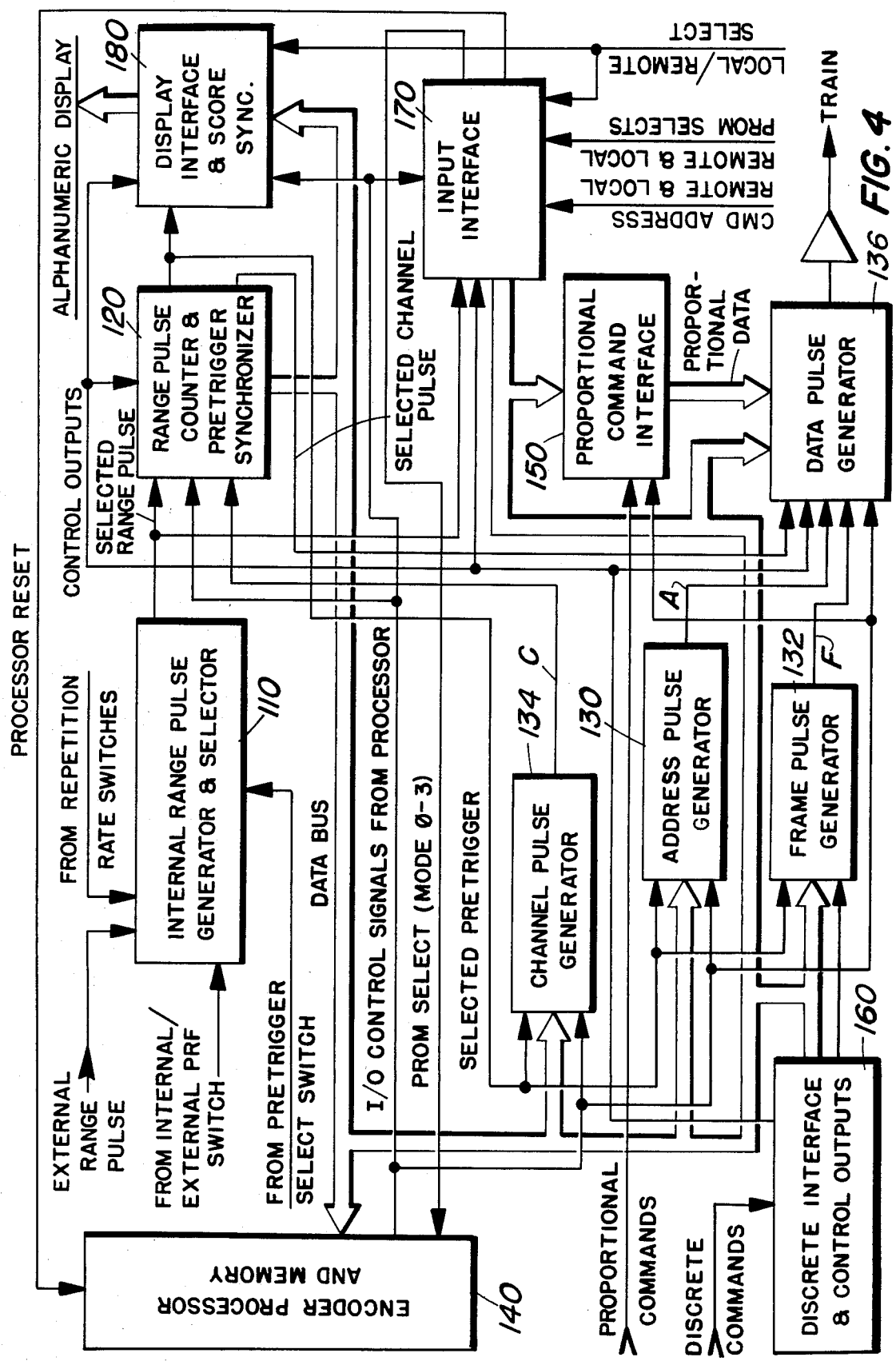

METHOD OF IDENTIFYING POSSIBLE VALID DATA PULSES IN A POSITION CODED PULSE TRAIN

TECHNICAL FIELD

This invention relates to pulse-position coded (PPC) communication systems, and specifically to such communication systems used for the control of unmanned vehicles and other apparatus.

BACKGROUND OF THE INVENTION

In various applications, it is necessary for an operator to cause some remote apparatus to perform a function in accordance with a command given by the operator. For example, unmanned aircraft (drones), used as targets for the testing of guided missiles, must be flown throughout the same envelope as the intended targets, i.e., manned aircraft. This, of course, requires that the control inputs which would be supplied by an onboard pilot be supplied instead by telemetry from the ground. The missiles themselves may also be guided toward the target by signals from a ground station. In order that the drone's or missile's position always be known accurately, and in order to maintain control at all times, two or more radar stations may track the vehicle during its flight, one station of which also transmits the telemetry used for control. The radar station in control is called the command station and transmits, on the uplink channel, the command interrogation signal. The other radar station is the tracking station; its uplink transmission is called the track interrogation signal.

The command interrogation signal consists of a number of pulses, position-coded with such information as the address of the drone being controlled, the number of the data channel (for example, pitch channel), and the actual data being supplied on that channel. (Throughout the specification, "information" will refer to any intelligence transmitted by the pulses, whereas "data" will be used to designate only that portion of the information which contains an operator's command to the vehicle to perform a specific function, or such other information as the originator wishes to communicate to the addressee.) The track interrogation signal consists of the first and last pulses of the command interrogation format. In each case, the final pulse in the format is the range (or "main bang") pulse, whose return from the vehicle (whether by reflection or downlink) will be used by the radar station's receiver to determine the range to the drone.

In general, the number of separate items of information which can be conveyed by PPC in a single unsynchronized pulse train is necessarily limited to one less than the number of pulses. For example, in prior art 4-pulse command uplink formats, only three pieces of information (usually address, channel, and data) could be transmitted within the pulse train during any given pulse format repetition interval (PFRI). This imposed a limitation on the system in that any desired redundancy had to be provided by retransmitting some portion of the uplink information during the next pulse train.

Because the drone and its communication system operate in a relatively controlled environment, the noise affecting them is of a different character than would be encountered elsewhere. In the case of command interrogation, the signal power received at the vehicle can usually be made large enough, through transmitter input power and antenna gain, so that random noise is not a problem. The problem occurs when more than one drone, or a drone and the associated guided missile, are being controlled and tracked on the same range. The communication system for each vehicle must meet two stringent requirements: it must first lock on to the correct interrogation signal, and it must also reject all other interrogation signals. Failure of the system to meet the first requirement, viz, to lock onto any interrogation signal at all, results in the condition called "command loss" which, if it persists, must frequently be dealt with by destroying the vehicle for safety reasons. Similarly, if the communication system locks onto the wrong uplink, and the proper lock-on cannot be regained, the vehicle may have to be destroyed. The type of interference of most concern to the communication system engineer designing for an unmanned vehicle is pulse interference from nearby radars. Interfering pulses may either be random, that is, occurring at any time, or "synchronous," which is the word used to describe pulses which occur at or near the pulse format repetition frequency (PFRF), or one of its multiples, of the command interrogation signal. Of these two types of interference, the more important is the synchronous type.

Aside from the obvious expedients of changing the interfering radar's pulse repetition frequency (PRF), carrier frequency, and physical location, which are not always possible, the prior art of pulse communication in general has attempted to solve the interference problem through several methods. One such method, exemplified by Lockhart U.S. Pat. No. 3,987,447, is to predict, through various means, approximately when a pulse or a train of pulses will occur, to establish a "window" with a suitable tolerance around the period of predicted occurrence, and to ignore all pulses which do not arrive within that window. If there is a good deal of uncertainty about the expected arrival time of the pulse or pulse train, a larger window may be created; but a larger window will admit more noise. For the greatest amount of noise reduction, the smallest possible window is required, and this in turn requires great certainty about the arrival times of the pulses containing the desired data. The window method is especially suitable for communication systems such as radar stations, which have a fixed and relatively stable PRF. Of course, any noise which actually occurs during the window will be received along with the desired pulses. For random noise, if it is assumed that the noise pulses are equally likely to occur at any time and are independent of each other, the probability of error depends upon their average frequency (f) and the length (t) of the window, in accordance with Poisson's formula:

$$P_n(k) = \frac{(ft)^k}{k!} e^{-ft} \quad (1)$$

If the communication system is structured so as to reject any pulse train which includes such a random pulse, Equation (1) also gives the probability that a chosen pulse train will be rejected. For synchronous interference, which by definition is not distributed at all but instead constantly recurs at or about the communication system's PRF, the probability of error is unity of the synchronous pulse occurs during the window and zero otherwise. Once again, if the communication system is structured to reject pulse trains containing an interfering pulse, all pulse trains will be rejected. Thus, the Lockhart or window method alone is not suitable to remove synchronous interference.

Another rudimentary prior art method for avoiding pulse interference is the parity check, alluded to above. Essentially, the parity check assumes that if there is one and only one pulse received during an interval when one pulse is expected, the received pulse is the correct one. If some number of pulses other than one is received during the interval, the simple parity check is unable to determine which received pulse is correct, and consequently rejects all pulses. Once again, the smaller the interval during which parity is applied, the greater the probability of eliminating random noise and the greater the probability that the received pulse will be the desired one. Synchronous noise, however, will not be eliminated by the parity check alone. An additional disadvantage of relying on the parity check is its poor performance in the presence of multipath transmissions. For example, when the controlling transmitter is mobile, or when the target drone or missile is being controlled at low altitudes, the parity check causes rejection of almost all commands.

Communication reliability may also be enhanced, in the presence of noise, by making the channel update frequency (PRF divided by the number of channels, assuming once update per channel per PRF) several times greater than the rate at which information on the channels will have to be changed. For discrete channels, those which transmit commands for vehicle functions manifested by a limited number of physical states of the vehicle (such as speedbrake in/out), "smoothing" is performed by requiring that the same command be received a number of times before it is executed. The counterpart, on proportional channels, to discrete channel smoothing is detailed in Varsos U.S. Pat. No. 3,386,081. (Proportional channels deal with vehicle functions which may be continuous in nature, such as throttle position.) The Varsos concept selects, as the new valid data pulse, that pulse which is closest in position to the channel's last valid data pulse. Obviously, neither discrete channel smoothing nor the Varsos technique will eliminate synchronous noise.

SUMMARY OF THE INVENTION

It is an object of the present invention to improve communication reliability in the presence of both synchronous and asynchronous interference. Specifically, an object of this invention is to improve the reliability of a communication system which uses position-coded pulse trains by eliminating interfering pulses from the pulse trains through a combination of devices.

Another object of the invention is to provide such a communication system, having improved reliability, including apparatus for encoding into the pulse trains the information to be communicated and apparatus for decoding the information from the pulse trains.

Another object of the invention is to provide a pulse train for use in the communication system which improves the reliability of communication.

Another object of the invention is to provide such a communication system and pulse train which are capable of controlling the operation of remote or unmanned vehicles.

To accomplish the foregoing objects, the invention employs a combination of devices which cooperate to reduce noise and allow reception of the desired data.

One such device is the transmission of redundant address information. This information is carried in the interpulse intervals of at least two pairs of pulses. (Interpulse intervals are, in the preferred embodiment, measured between the leading edges of the appropriate pulses.) These two pairs of pulses may be entirely separate or have a pulse in common. Although any two pairs of pulses can be used, the specific embodiment described here transmits the address information between the first and second pulses of a five-pulse train and between the third and fifth pulses. Therefore, decoding may be accomplished by first recognizing any received pair of pulses which are spaced at an interval corresponding to the expected first-to-second pulse interval, and then establishing rather narrow windows around the expected positions of the third and fifth pulses in order to confirm the address information. The extensive use of windows, which is another feature of this invention, is described in greater detail below.

Another device designed to eliminate interference relates to the transmission of data in a plurality of data channels. Each channel is used to transmit data of a single character, such as lateral stick position. Consecutive pulse trains carry consecutive channels, with channel one being transmitted in the next pulse train after the transmission of the highest channel used. Therefore, when it is known what channel was transmitted in the preceding pulse train, the channel number of the current pulse train is also known. The present invention uses a channel tracking counter, updated at the pulse format repetition frequency, to estimate the channel number of current pulse train based on the channel number of a previous pulse train and to verify that the decoded channel number is the correct one by comparing it to the estimated channel number. Additional confirmation is provided by transmitting the channel number in the interpulse intervals of at least two pairs of pulses. As in the case of address information, these two pairs may be entirely separate or may have a pulse in common. In the preferred embodiment, channel information is transmitted between the second and third pulses and between the second and fifth pulses. Channel information is therefore provided from three sources, the channel tracking counter and two interpulse intervals. If at least two of these three sources indicate that the same channel is being transmitted, that number is assumed to be the correct channel number.

A third feature of the invention is applicable to a particular type of data, proportional data, which, as noted above, controls continuously-variable vehicle functions such as throttle position. Although the proportional data is digital, the quanta by which it may vary are so much smaller than in the case of discrete data that it is, for all practical purposes, itself continuously variable.[1] For this reason, such data is transmitted on two different channels. In addition to this redundancy, and in order to avoid mistaking the redundant data for synchronous interfering pulses, one of the two channels will transmit the complement of the data, that is, of a data pulse whose position, when translated into binary digits, replaces zeros with ones and vice-versa. When the two channels containing the same proportional data are received, the true channel and the complementary channel are compared, and data is output only if the value of the data encoded in the complementary channel confirms the data encoded in the true channel. Complementing is not done for discrete data because, by its nature, it can be located in narrowly-defined windows.

1. In the preferred embodiment, data pulse resolution is 0.1 us in a 102.3 us data window, for a total of 1024 possible pulse positions.

Another feature of the invention, directly concerned with the problem of synchronous pulses, is interference counting. Synchronous pulses, as defined above, occur at or near the pulse format repetition frequency, or one of its multiples, of the command interrogation signal. This means that synchronous interfering pulses will occur at or about the same time position in each pulse train, regardless of which channel is being transmitted. In order to identify and eliminate synchronous pulses, the present invention uses interference counts, which indicate the frequency of occurrence of a pulse at a particular time position within the pulse train. (All time positions are referred to the final, or range pulse.) In the preferred embodiment, the interference count is increased by one, up to a maximum of seven, whenever a pulse occurs at a particular position, and decreased by one, to a minimum of zero, whenever there is no pulse at that position. Interference counts are used in two ways. For pulses which should occur in the same position during every pulse train, such as the range pulse, decoding includes a check to see that the interference count is at its maximum (or above a predetermined minimum). In the preferred embodiment, the third pulse is also fixed in position, and the same decoding criterion applies. Data pulses, on the other hand, should change in position from one pulse train to the next, because each pulse train transmits a different channel, which means that a different character of data is being sent. For example, the channel immediately following throttle position may be carrying rudder position information, which is not necessarily related to the throttle position. Therefore, if a data pulse occurs in the same time position during transmission of both the throttle and rudder channels, it may be suspected to be a synchronous interfering pulse. One criterion for decoding data pulses, therefore, is that the interference count be below a predetermined maximum.

A fifth device to eliminate noise is the comparison of the data received for a particular channel with the data previously received for that channel. When the data is discrete (dealing with on/off vehicle functions generally), the term used to describe this feature is called "smoothing." Discrete data is not accepted as valid unless the same data occurs in a predetermined number of subsequent consecutive transmissions of that channel. It should be noted that this is quite different from interference counting, which is concerned with consecutive transmissions of a pulse train, regardless of channel. Smoothing, on the other hand, comes into play only for pulse trains of the same channel. When the data is proportional, a slightly different version of the same concept is used. Because the proportional data is very nearly continuously variable, a requirement that it be the same in consecutive transmissions of the same channel would likely be unworkable. Therefore, when a valid proportional data pulse is received, a "tracking gate" is established around the time position of the valid data pulse for use in evaluating the validity of the next data pulse in the same channel. The concept of tracking gates recognizes as conditionally invalid any pulse whose position is farther than a chosen interval (the gate) from the position of the last valid data pulse in that channel. The condition for invalidity, is that another pulse exists within the chosen interval. Here it becomes important that all data transmitted in a single channel be of the same character, for the size of the tracking gate depends upon physical limitations within the particular system for which the data is being generated. For example, a tracking gate for the channel transmitting rudder position would take into account the maximum speed with which rudder position may be changed, and its tracking gate would then be set to encompass only those data pulses which indicate a new rudder position no farther than the maximum possible distance from the previous rudder position. At first, data pulses are only sought within the tracking gate. However, if no valid data pulse exists within the tracking gate, the gate may be expended, and eventually the present invention will accept, as valid data, that pulse whose time position is closest to the previous valid data pulse (assuming that all other criteria for valid data have been satisfied).

A sixth feature of the invention is the maximum use of windows around the expected positions of pulses. The major window, which in the preferred embodiment is defined by hardware, is the enabling signal window. This window is opened during the expected occurrence of the entire pulse train. Additional windows, defined by software in the preferred embodiment, are established within the enabling signal window. Often, there are several levels of software windows. For example, because of the wide range of data which may be transmitted, there is a large data window (102.3 microseconds in the preferred embodiment) within which the communication system may search for a data pulse. Within this data window, however, as noted above, valid discrete data may be found only in a further subdivision, the discrete data windows, and valid proportional data is first sought within a relatively narrow tracking gate. Similarly, pulses which indicate channel numbers (the second pulse in the preferred embodiment), although variable in position, can assume only one of a small number of fixed positions. A number of extremely narrow windows are therefore established around these positions. Extremely narrow windows are also established around the "immovable" pulses, such as the large pulse.

A related feature makes use of another entire set of windows overlying those discussed so far. In order to facilitate interference counting in the face of pulses whose positions may vary slightly due to a number of factors (such as relative motion between transmitter and receiver or limitations in synchronizing the receiver's clock with the transmitter's), the enabling signal window may be divided into one or more sets of contiguous interference windows. When this is done, the interference count for any particular pulse refers to the frequency of occurrence of pulses of the particular interference window in which that pulse falls. A pulse occurring anywhere within the window will increment the interference count. Because pulses may drift back and forth from one window to another, and yet still be synchronous interfering pulses, a second continuous set of interference windows is established throughout the enabling signal window, the windows of the second set overlapping those of the first set by half a window width. Any pulse occurring during the enabling signal window, therefore, will fall within two interference windows and increment two interference counts, one for each window. (For convenience, the sets are called "even" and "odd" interference windows.)

Parity is also a feature of the present invention. In a given pulse train, exactly one data pulse is transmitted in the data window. Upon receipt of a pulse train, after elimination of all pulses which do not satisfy other criteria (such as falling within the data window, having an inteference count less than a predetermined value, and having a complementary value transmitted on another channel), the receiver identifies the remaining pulse as the valid data pulse if and only if it is unique.

A final feature of the invention is related to all the foregoing features; according to this facet of the invention, all of the information conveyed by a given pulse train is not contained within the pulse train itself. By determining some essential information beforehand, especially the pulse format, a five-pulse train may be made to carry more than the four separate items of information which are the theoretical maximum for the general case. A good example of this is the transmission of consecutive channels. If channels were randomly transmitted, no channel tracking counter could be used, and all channel information would have to come from the pulse train itself. The knowledge that consecutive channels are being transmitted, which knowledge is not carried within the confines of any pulse train, enables one to label the channel information carried by the pulse train itself as truly redundant. In addition to providing the basis for verifying channel information, the previous pulse train also conveys another important piece of information, namely, the location of the leading edge of the range pulse. Knowing this, along with the pulse format repetition frequency (which by definition is an element of information impossible to convey in a single pulse train), the receiver can open the all-important enabling signal window to admit only those pulses falling within the predicted period of occurrence of the next pulse train. Similarly, the predetermined information concerning physical limitations of the unmanned vehicle's systems enables the communication system engineer to establish tracking gates for the proportional data, something which could not be done for data of a random character. The relationship between interference counts and discrete data smoothing has already been explained. Without the knowledge that discrete channels were being transmitted at regular, non-consecutive intervals, either interference counting or smoothing would have to be eliminated.

The foregoing features are implemented in a communication system comprising the general elements shown in FIG. 1, a block diagram of the overall system used in tracking and controlling a remote airborne vehicle. On the ground, a conventional radar transmitter comprising oscillator 1, modulator 2 and amplifier 3 accepts pulse trains from encoder 100 and uses the pulse trains to modulate a radio frequency. The modulated radio frequency is then transmitted from antenna 4. Data to be transmitted is received by encoder 100 which also receives, or includes a source of, regularly occurring reference (range) pulses. The interval between the reference pulses is measured, and the encoder generates a trigger pulse at a predetermined time in advance of each reference pulse. From the value of the data, the encoder can calculate the desired time position of a pulse which will indicate that data; the encoder then calculates a count to be loaded into a counter which will generate a data pulse at the desired position when it started counting by, or in response to, the trigger pulse. (In the preferred embodiment, the data counter is started counting by the frame pulse; the frame pulse, in turn is generated by a frame counter which is started counting by the trigger pulse.) In addition to data, the encoder also receives information concerning the address of the vehicle to which the data is being transmitted and the channel number of the data. These are also encoded into pulses in the same way. All pulses generated by the counters are combined with the reference pulse to form a pulse train. The position-coded pulse train is then used to modulate a radio frequency carrier for transmission over the communication channel.

In the vehicle is a conventional radar receiver comprising RF amplifier 5, oscillator 6, mixer 7, IF amplifier 8, demodulator 9, and video amplifier 10. The modulated radio frequency from the ground station is intercepted by vehicle antenna 11 and, in the conventional manner, demodulated into a string of video pulses made up of a plurality of position-coded pulse trains infused with a varying number interfering pulses introduced by the noisy communication channel. Decoder 200 receives the video pulses, searching first for the correct vehicle address. From the frequency of occurrence of pairs of pulses spaced at an interpulse interval indicating its address, the decoder can calculate the pulse format repetition frequency (PFRF) and predict the period of occurrence of the next one of the pulse trains. The decoder then opens the enabling signal window from a time just before the earliest expected pulse of the next pulse train through a time just after the leading edge of that pulse train's reference pulse, which is the final pulse. The decoder stores the arrival times of all pulses arriving during the enabling signal window and calculates the address, channel and data information from the stored arrival times. Windows are established around the expected positions of all possible valid pulses, considering the range of address, channel, and data information which may be received (only one address will be pertinent). The correct channel number, and, ultimately, the valid data are calculated by the combination of methods described above.

The preferred embodiments employs a pulse train consisting of five pulses to convey an item of data in a single channel to a single addressee. Two typical pulse trains are illustrated in FIG. 2, which shows the following pulses in the order given: Address (A), Frame (F), Channel (C), and Range (R). The Data pulse (D) of each pulse train occurs somewhere within the data window, depending upon the value of the data and whether it is discrete or proportional. The R pulses of consecutive pulse trains occur at a substantially constant Pulse Repetition Interval (PRI).[2]

[2]. The reason for positioning all intelligence pulses in advance of the range pulse is that, in the usual system, a reply to the ground station's interrogation must be transmitted as soon as the range pulse is received; there is very little time for calculation of address, channel, etc., after receipt of the range pulse.

The time intervals given in FIG. 2 represent the time positions of the indicated pulses in advance of the R pulse, at minimum address, in microseconds. Each unit increase of the vehicle address increases the A-F interpulse interval by 1 us and increases the C-R interpulse interval by 1 us. (The A pulse therefore advances by 2 us.) FIG. 2A illustrates a pulse train for channel 1, while FIG. 2B depicts the arrangement for channel 16. Other channels have pulse spacings intermediate between the two pulse trains shown. As is apparent from FIG. 2, a unit increase in channel number (the address remaining constant) causes the A and F pulses, and the data window, to advance 1 us in time with respect to the R pulse. The position of the C pulse, however, remains constant in relation to the R pulse because the C-R interpulse interval is a function of the vehicle address. Channel number, represented by F-C interpulse interval, and range number, represented by the F-R interpulse interval, increase by 1 us for each unit increase in the channel number (and the consequent advancement of the F pulse). The A-F interpulse interval, which is dependent upon the address, also remains constant, although both the A and F pulses advance together with an increase in the channel number. Table 1 lists some pulse spacing constants for the preferred embodiment.

TABLE 1

| PULSE SPACING CONSTANTS, us | |
|---|---|
| INTERVAL | SPACING |
| A-F, minimum address | 15 |
| F-C, channel 1 | 3.5 |
| F-C, channel 16 | 18.5 |
| F-Data Window | 49 |
| C-R, minimum address | 178.5 |
| Data Window width | 102.3 |

FIG. 3 shows the relationship between the pulse train, the enabling signal window, and the two overlapping sets of contiguous interference windows. The leading edge of the earliest expected address pulse is indicated by A. Twenty-five microseconds before this, the enabling signal window, Z-time, is opened in hardware. This enabling signal window is closed 3.5 us after the leading edge of the range pulse, labelled R.

Z-Time is divided into two overlapping sets of contiguous interference windows, as illustrated in FIG. 3. (For convenience, the sets are labelled "even" and "odd.") In the preferred embodiment, each interference window is 1.6 us wide; and the boundaries between those in the even set are displaced from the boundaries between those in the odd set by 800 ns (hence the term "overlapping").

A typical interfering pulse is shown at I. It is apparent that any pulse, including I, will fall into two interference windows, one of the even set and one of the odd. Pulse I falls into windows $O_4$ and $E_5$ and will therefore cause the interference counts for each of these windows to be incremented by one. If, over a period of several PRI's, pulse I slowly drifts, with respect to Z-time, to the position labelled I', it will no longer fall into interference window $O_4$, and the interference count for window $O_4$ will not be incremented (in fact, the count will be decremented if the window contains no pulse). This could be a misleading indication that the pulse is not a synchronous interfering pulse (which it is). The other set of interference windows overcomes this problem. If the synchronous interfering pulse drifts from I to I', it remains in interference window $E_5$ and is therefore recognized as a true synchronous interfering pulse.

Other objects and features of this invention will become apparent from the following description taken in connection with the accompanying drawings wherein are set forth, by way of illustration and example, certain embodiments of this invention.

BRIEF DESCRIPTION OF THE DRAWINGS

FIG. 1 is a block diagram of a communication system incorporating the present invention.

FIG. 2A is a graph showing the time relationships of the various pulses used in a transmission on channel 1 in the preferred embodiment.

FIG. 2B is a graph showing the time relationships of the various pulses used in a transmission on channel 16 in the preferred embodiment.

FIG. 4 is a block diagram of the encoder hardware.

DETAILED DESCRIPTION OF A SPECIFIC EMBODIMENT

Table of Contents

Figure 3:
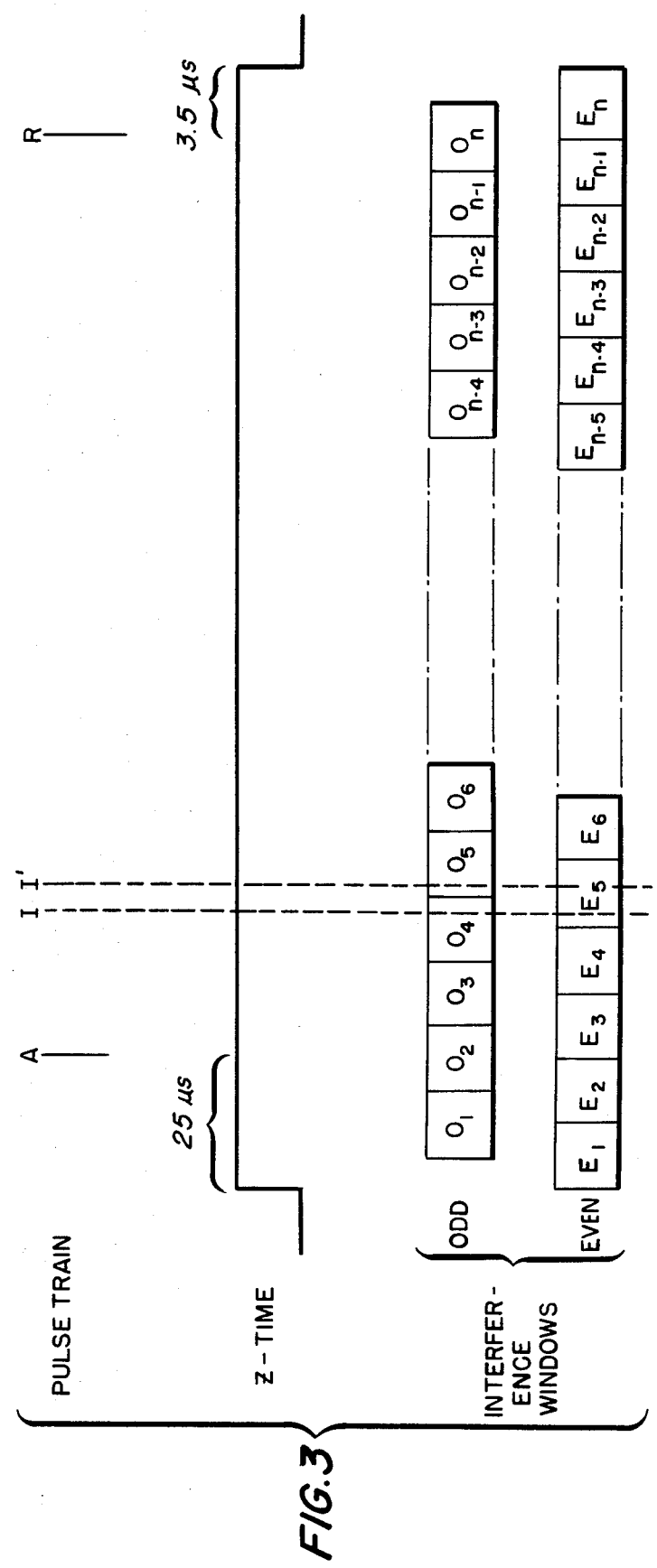
FIG. 3 is a graph showing the time relationships of the pulse train, the enabling signal window, and the interference windows of the preferred embodiment.

ENCODER HARDWARE
   Internal Range Pulse Generator and Range Pulse Selector
   Display Interface
   Range Pulse Counter and Pretrigger Synchronizer
   Pulse Generators
   Encoder Processor and Memory
   Proportional Command Interface
   Discrete Interface
   Input Interface
ENCODER SOFTWARE
DECODER HARDWARE
   General
   Pulse Group Recognition Circuits
   Pulse Repetition Interval (PRI) Synchronizer Circuits
   Pulse Storage and Interference Processor Circuits
   Decoder Processor
   Proportional Output Circuits
   24 Bit Discrete Store/Output Circuits
DECODER SOFTWARE
   System Description
   A. Power up Program
   B. Channel Tracking Program
   C. Decoding Processor Program
   D. IDLE Program
   Module-Level Description of Decoding Processor Software
   A. FPSRCH
   B. CRPSRH
   C. CFSRCH
   D. DDSRCH
   E. PDSEARCH
   F. PCSEARCH
   G. OUTPUT

ENCODER HARDWARE

The encoder 100 comprises four major subsections: (1) the Internal Range Pulse Generator and Range Pulse Selector 110, (2) the Range Pulse Counter and Pretrigger Synchronizer 120, (3) the Pulse Generators 130, 132, 134 and 136, and (4) the Encoder Processor and its associated Memory 140. Refer to FIG. 4.

Internal Range Pulse Generator and Range Pulse Selector

The Internal Range Pulse Generator and Range Pulse Selector 110 is generally a five decade synchronous BCD counter which accepts the selected pulse repetition interval from the PRI select thumbwheel switches. This five decade value is then used to modify the count of the chain in order to provide range pulses whose interval is equal (in microseconds) to the value on the PRI select thumbwheel switches. This internally generated range pulse or an externally generated range pulse is made available for selection by means of a toggle switch on the rear panel.

The internal range pulse generator and range pulse selector comprises three major subsections. The first is the internal range pulse generator, which consists of a twenty bit decade down-counter chain. These five counters are preloaded with the desired interval count from the PRI select thumbwheel switch, located inside the unit. The counters decrement at a clock rate of 10 MHz. As each counter in the chain rolls over to "Count 0", pin 15 of that counter will go to a LOGIC "0". When the four most significant counters have rolled over to "Count 0", and when the fifth is at a count of "2", a LOGIC "0" is applied to both inputs of a JK flip-flop whose Q output is then clocked to a low by 10 MHz. The Q output of this flip-flop is then applied to the load control inputs of the five counters to reload the selected value. The internal range pulse is generated by applying the LOGIC "0" output of the counters to another flip-flop which is clocked reset by 10 MHz, and then clocked set again.

The second subsection comprises an external range pulse synchronizing and delay circuit. A comparator accepts pulse inputs greater than +3 VDC. The Q output of the first of three D flip-flops is latched high by the external range pulse out of the comparator. The second D flip-flop clocks high on the first rising edge of the 20 MHz clock; while the third clocks high on the next rising edge of 20 MHz, and resets the first. Two clock cycles later, the third flip-flop clocks low, thus providing a 100 ns wide synchronized range pulse at its Q output. The 20 MHz signal is divided by two, which provides 10 MHz and $\overline{10\ MHz}$ signals. A flip-flop synchronizes the incoming external range pulse to the rising edge of the 10 MHz clock. When the Q output of this flip-flop switches to a LOGIC "1" on receipt of an external range pulse, the J input of a JK flip-flop switches to a LOGIC "1" also. The $\overline{K}$ input is low, and the $\overline{Q}$ output of the first flip-flop becomes the range pulse.

The third subsection of the internal range pulse generator and range pulse selector is the range pulse gating arrangement. The internal and external range pulses are brought into three input gates. Input signal "INT/EXT RANGE PULSE SELECT", which is switched from the rear panel, determines which range pulse and thus which of the three gates is to be selected. If the gates for external range pulses are selected, then the choice is further narrowed by consideration of the inverted "Pretrigger Select" input, which determines whether the external range (trigger) pulse is a range pulse or a pretrigger pulse.

Two decoders, one octal and one hexadecimal, decode the group and channel, respectively. Their outputs are enabled by the selected trigger pulse and are applied to the front panel channel and group synchronization rotary switches. An additional "every PRF" scope synchronization is also available at the front panel.

A one-shot monitors the selected range pulse. The time constant has been selected to be approximately twice the value of the longest possible PRI. Should the range pulse stop, due to a failure in the encoder or the disconnection of the external range pulse from the rear panel, the Q output of the one-shot will go low. The microprocessor polls this line every PRI and, if low, an appropriate error message will be written to the front panel alphanumeric display by the software.

Display Interface

Display interface and scope synchronization circuit 180 consists of conventional circuits arranged to present desired information about the encoder, such as the number of channels, the PRF, or the pulse format, in human-readable form on conventional numeric and graphic displays.

Range Pulse Counter and Pretrigger Synchronizer

The functions of the Range Pulse Counter and Pretrigger Synchronizer 120 are to measure the interval of the range pulse (whether internally or externally generated) and to store the binary representation of that interval in three octal latches. From these, the binary representation is transferred to dedicated locations in the processor memory. Furthermore, the binary representation of the range pulse interval is transferred at the same time to a second binary counter chain, which counts down and generates three trigger pulses, one of which is required in order to start the pulse generators. These three triggers are routed to a multiplexer, where one of the three is selected according to which type of pulse format is being encoded.

Five counters count up and measure the interval of the range pulse. Five additional counters count down to generate the triggers required to time the encoder. The counting and resetting of these counters are controlled by flip-flops; all range pulses are gated with the $\overline{10\ MHz}$ clock. When the range pulse occurs, the up counters are stopped and the down counters loaded. The next falling edge of the $\overline{10\ MHz}$ clock resets the up counters and starts the down counters counting. Finally, the next falling edge of the 10 MHz starts the up counters counting.

As the down counters count down, decoders decode the three triggers ($T_c$-230, $T_c$-238, and $T_c$-277) required to start the pulse generator timing. Only one trigger pulse is used at any one time, based on which of the four basic formats is being encoded. This is accomplished in a multiplexer, enabled by the internal/external range pulse select switch. The channel pulse is software selected by two gates. The latched range pulse interval count is read under software control. Two flip-flops, initially reset, comprise a range pulse counter. When the first range pulse occurs, the first is set while the second remains reset. Upon receipt of the second and subsequent range pulses, their states are reversed.

Pulse Generators

The selected trigger starts the address, frame and channel pulse generators. The position of the address pulse with respect to the trigger is a function of the address and the current channel being encoded. The position of the frame pulse with respect to the trigger is a function of the channel being encoded. The address and frame pulse generators are preset with a constant value, which is, in turn, modified by the encoder processor, with the address and channel. These new values are then loaded into the address and frame pulse generators. When the delayed trigger pulse occurs, the two pulse generators start and, at the predetermined time, the address and frame pulses occur.

In a similar manner, the position of the channel pulse with respect to the trigger is a function of the format length and type and the address. Therefore, the processor performs the calculations necessary to provide the preload value for the channel counter which, on receipt of the trigger, runs and outputs the channel pulse.

The data pulse generator comprises two 12 bit synchronous binary counter chains. The first chain, started by the frame pulse, provides the start pulse for the second. The position of this start pulse with respect to the frame pulse is a function of the format type and length. Therefore, the processor calculates this value and preloads it into the first counter chain which, upon receipt of the frame pulse, begins running and outputs the start pulse for the data counter.

The twelve-bit data counter is used as a ten bit synchronous binary counter chain which accepts data, via the processor, from the A/D converter, digital proportional interface, or discrete interface, according to the channel programming requirements. Once in the processor, the data value, type, and bit weighting are considered. From these, the data counter preload value is calculated. This value is then loaded into the data counter which, on receipt of the start pulse, begins counting, and, at terminal count, outputs the data pulse. The address, frame, channel, data and range pulses are logically "OR'ed" and are available at the front panel as "TRAIN", and are amplified and available at the rear panel.

The address, frame, channel and data pulses are generated on a single circuit card. With the exception of latch enables, the address 130, frame 132, and channel pulse 134 generators are identical. The address pulse generator 130 is preloaded with a count which has been calculated in software. In its normal state (not counting), the counters are held by a flip-flop in the load condition. Upon receipt of a selected trigger, the flip-flop is set, allowing the counters to begin counting up from the preloaded value. When all counters reach terminal count, a gate outputs the active low address pulse. On the rising edge of the address pulse, the counters are stopped and reloaded, waiting until the next selected trigger occurs. The frame and channel pulse generators work in an identical manner.

The data pulse generator 136 functions similarly to the pulse generators discussed above. It comprises two 12 bit counter chains, the first of which is programmed in software to provide the time delay (49 us) between the frame pulse and the start of the data window. The counter chain is normally held in a load condition by a flip-flop. Upon receipt of a frame pulse, the flip-flop is set, releasing the counter to count. When the counter chain reaches terminal count, it outputs an active low pulse which starts the second 12 bit counter. The rising edge of the start pulse clocks the flip-flop reset and again holds the counter in a load condition.

The second 12 bit counter chain actually performs the data pulse encoding. The counter chain is normally held in a load condition by a flip-flop. On receipt of the falling edge of the start pulse from the first counter, the flip-flop is clocked set, releasing the counter to count. When the counter reaches terminal count, it outputs the active low data pulse, which is applied to a gate array. The gate array performs two functions—first, it logically "OR's" the address, frame, channel, data, and range pulses together to form the pulse train; second, it serves to block throughput of all or part of the pulses for "train disable." The entire pulse train is shaped and applied to a 50 ohm driver for "train."

Encoder Processor and Memory

The encoder processor 140 is a Z-80A based microcomputer. It includes a microprocessor, 2048 bytes of 8 bit read-write scratchpad memory, and 4096 bytes of read only program memory. It also includes priority interrupt circuits which are used in synchronizing the encoder software to the encoding process. Address decoding for all peripheral devices is performed by the processor as well. The microprocessor transfer data to and from its memory and peripheral devices over an eight-bit data bus under control of the decoded address signals. The encoder software is responsible for continuous verification of the Pulse Format Repetition Interval (PRFRI), for maintaining a running count of such things as current channel and group count, for calculation of the various pulse generator preload values, and for the updating of the front panel fluorescent display.

Proportional Command Interface

The Proportional Command Interface 150 comprises two major subsections: (1) the digital proportional command storage; and (2) the A/D converter.

The digital proportional command storage is capable of storing sixteen 10-bit proportional command words in three 4-bit storage cells, each 16 bytes deep. These three storage cells may be addressed and simultaneously written into from a rear panel connector. Four address lines dictate the particular byte into which the data word will be written upon application of proportional enable. Data is read out from the cells and latched into two encoders. The 4-bit read address to the cells is computed in software and applied via a driver and a decoder to the memory cells; this read address determines which data byte in the storage cells is to be read and encoded.

The A/D converter includes a 16 channel analog multiplexer controlled by the read address as discussed above. The 0 to +5 VDC output of the multiplexer is applied to a voltage doubler and thence to the analog to digital converter. The A/D conversion is initiated by a microprocessor address decode, which is stretched to 2 us width. The 10-bit proportional word out of the converter is made available to the data bus through latches. A different pair of latches is activated according to whether the proportional commands are available in an analog or a digital form.

Discrete Interface

The discrete interface 160 comprises two circuit card assemblies, each for a maximum of 48 discretes. Each card has six octal latches, the inputs of which go to rear panel connectors and the outputs of which are connected to the microprocessor data bus. Each latch has its own data bus enable in order that it may be read by the microcomputer as required by the software.

Input Interface

Input Interface 170 performs miscellaneous functions not covered elsewhere.

The processor reset circuit comprises four exclusive —OR (XOR) gates arranged to trigger on any change in the levels of the four lines coming from the front panel mode select switch. The XOR gates for each line are logically "OR'ed" in order to provide an active low reset pulse to be applied to the reset line on the microprocessor any time the switch changes position. Input are: the local and remote format selects from either the front panel format select switch or from a rear panel connector; and local and remote command addresses from either the front panel address switches or from the rear panel connector (the local/remote select line comes from the connector and defaults to the local mode). The selected format mode is applied via the card edge connector. The selected command address is applied to two encoders. One is selected whenever the input signal CODE is low, while the other is selected whenever CODE is high. The encoder outputs are enabled onto the processor data bus under software control.

Inputs accepted from the computer control connector allow control of the channel update rate externally. These are also enabled onto the processor data bus.

ENCODER SOFTWARE

Figure 5A:
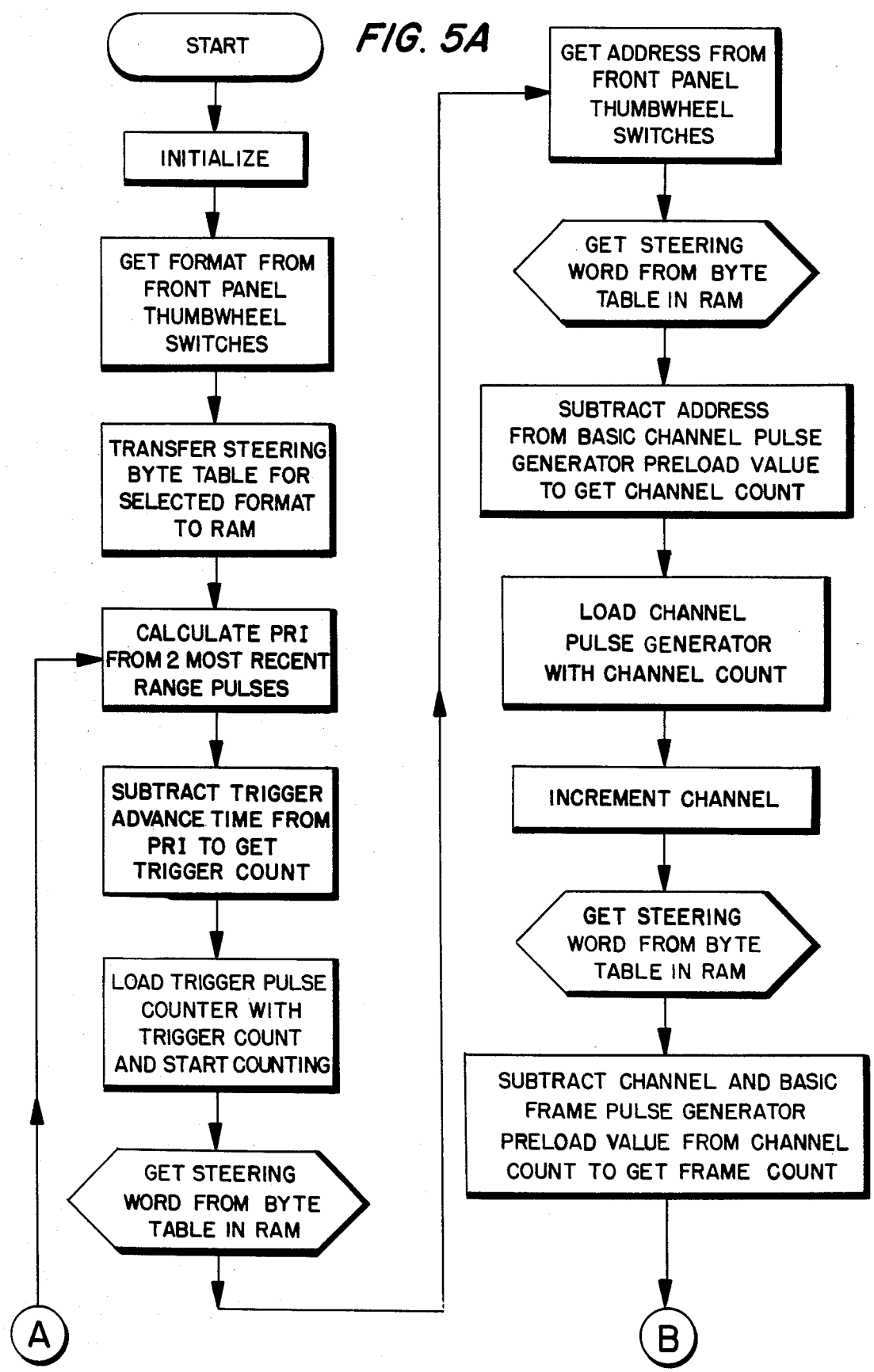
FIGS. 5A and 5B are flow chart illustrating the operation of the encoder software.
Figure 5B:
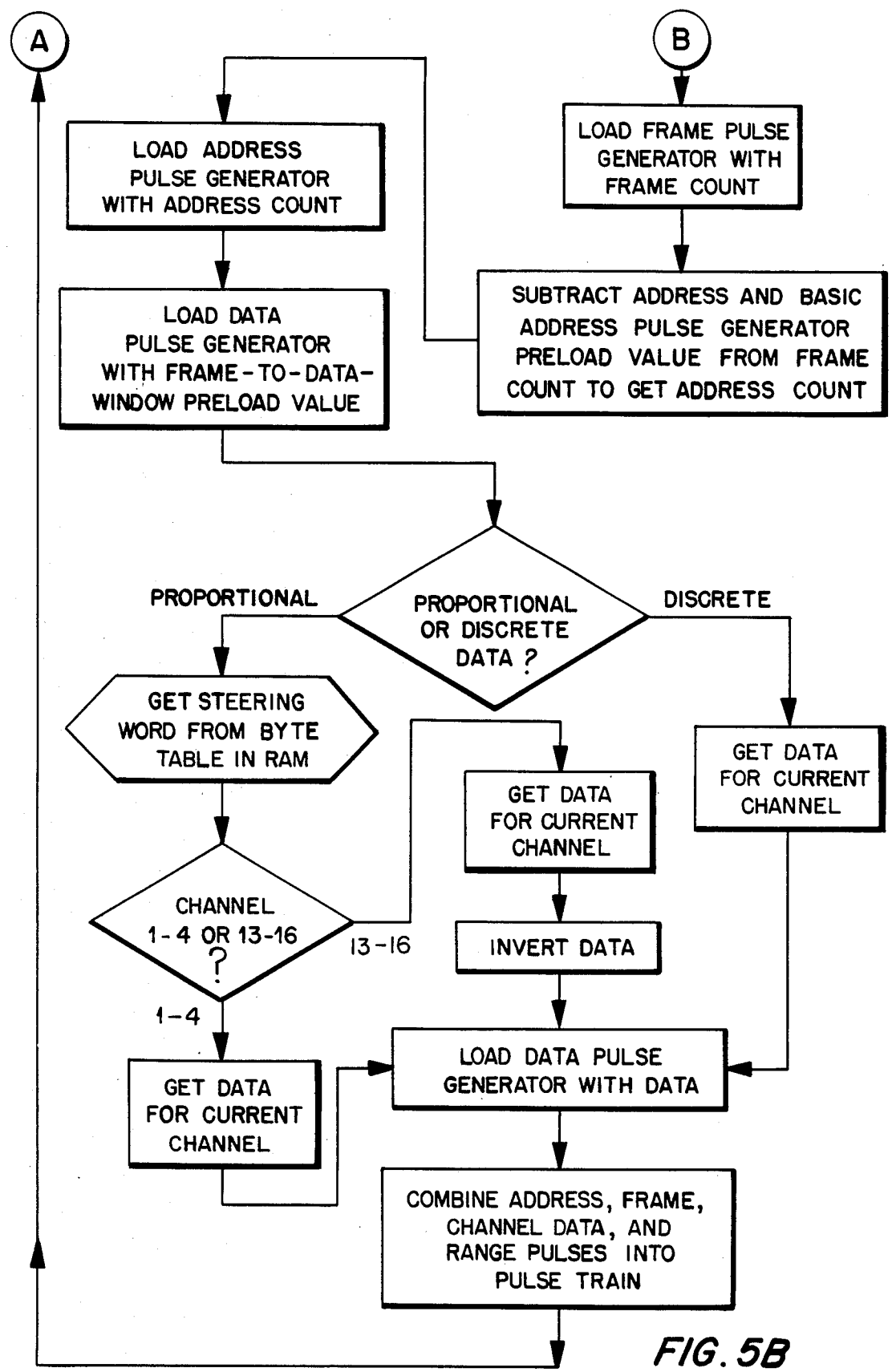

Refer to FIGS. 5A and 5B, which illustrate the flow chart for the encoder software. Prior to operating the encoder, the operator must make several selections by activating the appropriate front panel switches. The principal selections are pulse train format and vehicle address. The five-pulse format used in the preferred embodiment of this invention, which has been extensively discussed, will not be further described here; however, other formats may be encoded with this encoder. Obviously, the numbers and positions of pulses of the particular format in use must be known in order to encode a pulse train of the format.

Once a format is selected, the encoder retrieves the "Steering Byte Table" for the format from the PROM and enters it into its RAM. The function of the Steering Byte Table, which will be further described below, is generally to guide the encoder through the appropriate sections of its program (according to the selected format) and to circumvent the inappropriate programming steps. Only the steps appropriate to the preferred format will be described here.

Although the desired PRI will have been selected by the encoder operator through front panel switches, for accuracy the encoder measures the interval between each pair of range pulses. This interval is then used to position the trigger pulse at the proper time position in advance of the next range pulse. For example, if the selected PRF is 500/s, there are 2000 us between consecutive range pulses. For the preferred pulse format, a trigger advance time of 277 us is required ($T_c$-277). Consequently, a count representing the difference, 1723 us, will be loaded into the trigger pulse counter.

At this point, the program branches in several directions, the correct one depending upon the selected format. In order to determine which program set is next, the next steering word is read from the byte table previously stored in the RAM, and the program jumps to the step indicated by the steering word. Such jumps, to locations specified by the steering byte table, may occur several times in a program. (Additional jumps will not be described here.)

In effect, each format has a separate program stored in the encoder. Because each program has some steps in common with some other program, storage space is reduced by only storing one of each of the common program steps and jumping to and from the various common program steps. Each program, of course, also has some non-common steps (not shared with any other program). In order to reach a non-common step after executing a common step, the program must jump. The jump instruction itself is the final common program step where the choice is made as to which non-common program step will be executed. Before executing the jump, the program loads the location of the next succeeding non-common program step into an address location with represents the jump destination. This location is a steering byte taken from the chosen steering byte table (the table having been chosen in accordance with the selected format). When the jump is executed, therefore, the program jumps to the appropriate step for the selected format.

In the preferred embodiment, the program next obtains the address of the vehicle to which commands are to be sent; the address, like the format, has been preselected by the encoder operator through front panel switches. The address, which is a decimal integer, corresponds to the number of microseconds between the C and R pulses less 177.5 (see Table 1: for the minimum address—address 1—C to R spacing is 178.5 us). In order to place a channel pulse at the proper time position in advance of the range pulse, it must occur at (99.5—ADDRESS) us following the trigger pulse (which precedes the range pulse by 277 us). The basic channel pulse generator preload value, therefore, is a count corresponding to 99.5 us. A count corresponding to the address is then subtracted from the basic preload value, and the resulting channel count is loaded into the channel pulse generator, which will output the channel pulse upon counting out (after counting is initiated by the trigger pulse).

The position of the frame pulse depends upon the channel number and the position of the channel pulse. Therefore, after the channel number is incremented modulo 16 (the system powers up in channel 0), the frame count is calculated by sutracting, from the channel count, the channel number and a basic frame pulse generator preload value. This preload value is a count corresponding to 2.5 us (see Table 1: for the first channel—channel 1—F to C spacing is 3.5 us). The frame count is loaded into the frame pulse generator to wait for the occurrence of the trigger pulse.

The third calculation is of the address count which, once again, involves the actual address and a preload value. The preload value is a count corresponding to 14 us (see Table 1: for the minimum address—address 1—A to F spacing is 15 us). The address count is calculated by subtracting the preload value and the address from the frame count; and it is then loaded into the address pulse generator.

As was mentioned above, the data pulse generator is unique in two ways: it comprises two counters, not one, and it is started counting by the frame pulse rather than by the trigger pulse. The reasons for these features are that the data value corresponds to the actual time position of the data pulse following the beginning of the data window and that the beginning of the data window always follows the frame pulse by 49 us (see Table 1). Therefore, the first counter in the data pulse generator is loaded with a count corresponding to 49 us, and its counting out causes the second counter, which is loaded with the data, to begin counting.

The program must determine whether the data being transmitted in the current channel are discrete (channels 5–12) or proportional (channels 1–4 and 13–16) and, if proportional, whether true (1–4) or complementary (13–16) proportional. If the current channel is 1–12 (true proportional or discrete), the data need only be loaded into the second counter. If channels 13–16 are being encoded, the data are inverted (ones substituted for zeros, and vice-versa) before loading into the counter.

Finally, the pulses generated by the counting out of the various counters are combined into a pulse train, and the process begins again with calculation of the PRI.

DECODER HARDWARE

General

The decoder 200 is designed to decode the five pulse command uplink pulse-position-code (PPC) format. Outputs of this decoder are four analog channels, each ranging from −2.500 to +2.495 VDC with 5 mV resolution, and Common, NO, and NC contacts for 48 relays.

Figure 6:
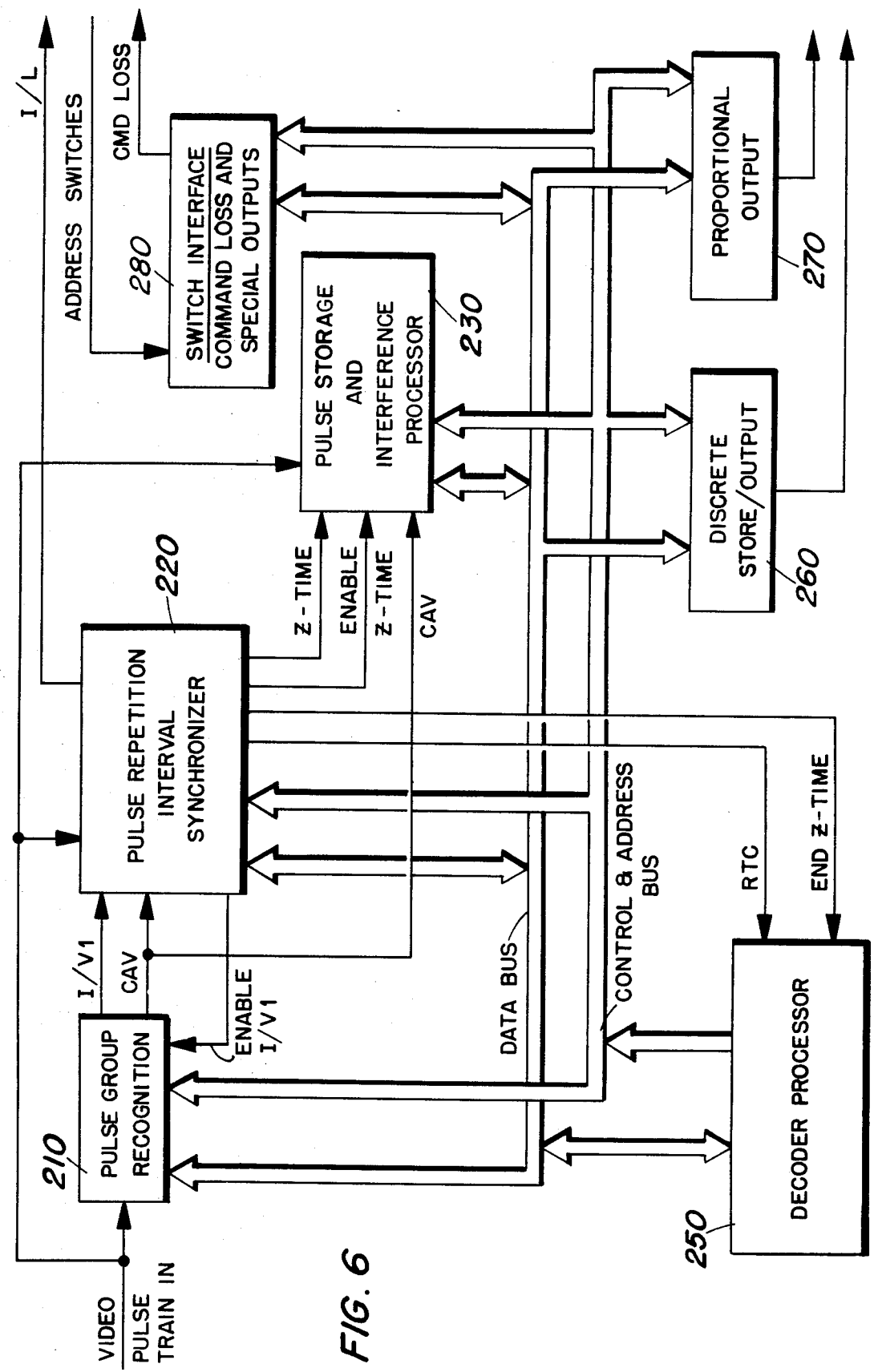
FIG. 6 is a block diagram of the decoder hardware.

FIG. 6 is a general block diagram showing the major functional elements of the decoder. The purpose of the Pulse Group Recognition circuits 210 is to detect the Address, Frame, Channel and Range pulses of the five pulse command uplink pulse group with the correct vehicle address and the correct number of channels. There are two outputs of this circuitry. When a command interrogation is received, the Command Address Verification (CAV) pulse is coincident with the command uplink Frame pulse, and the Interrogation Verification 1 (I/V1) pulse is coincident with the command uplink Range pulse (it must be preceded by a CAV).

The PRI Synchronizer circuitry 220 uses the outputs of the Pulse Group Recognition circuits 210 and the video input to synchronize to the command uplink pulse group. The outputs of the PRI Synchronizer 220 include the Z-Time signal, which is used as a window to enable the Pulse Storage and Interference Processor circuits 230. The Z-Time and Real-Time-Clock signals output from the PRI Synchronizer are also used by the Decoder Processor 250 to synchronize the decoder software to the data acquisition function of the Pulse Storage and Interference Processor Circuits.

The Pulse Storage and Interfence Processor circuits 230 use the Z-Time signal as a timing reference and enabling signal window. The Pulse Storage Circuits record the arrival time with respect to the leading edge of Z-Time of all video pulses which occur during Z-Time. The interference processor circuits record the number of times in successive pulse trains that a pulse occurs in the same approximate position within Z-Time, in order to detect synchronous pulses.

The Decoder Processor 250 is a Z-80A-based microcomputer. It includes a microprocessor, 1024 words of eight-bit read-write scratchpad memory, and 4096 words of read-only program memory. It also includes priority interrupt circuits which are used in synchronizing the decoder software to the data acquisition process, using the Real-Time Clock and Z-Time signals. Address decoding for all peripheral devices with which the Decoder Processor communicates is performed in the Decoder Processor circuits as well. The microprocessor transfers data to and from its memory and peripheral devices over an eight-bit data bus under control of the decoded address strobe signals. The decoder software is responsible for providing setup data to the Pulse Group Recognition Circuits 210 and the PRI Synchronizer 220 upon power-up. When command uplinks are being received, the decoder software takes the pulse timing information from the Pulse Storage circuits and the measurements of the interference processor circuits and decodes the pulse position code, removing interfering pulses from the data if necessary, and outputs data to the Discrete Store/Output Interface 260 and Proportional Output Interface 270.

The Switch Interface and Command Loss and Special Outputs circuits 280 provide interface functions between the Decoder Processor 250 and the front panel Command Address switch, the Command Loss output, and two other driven TTL-level outputs for discrete outputs. The Decoder Processor 250 reads the address switch upon power-up and uses the address information to set up the Pulse Group Recognition 210 and PRI Synchronizer 220 circuits. It outputs current command loss status each PRI.

The Discrete Store/Output Interface 260 includes two 24-bit circuits each containing latches, drivers, and relays for 24 discrete bits of data. COMMON, NO and NC outputs from each relay are brought out to front panel connectors. Automatic reset is provided for all bits when power is first applied to the unit.

The Proportional Output Interface 270 is capable of outputting up to eight proportional (analog) signals. Each signal is programmable to operate within a −10.000 to +9.995 VDC range. The maximum voltage resolution is 5 mV. Software selectable output voltage ranges include −10 to +10, −5 to +5, −2.5 to +2.5, 0 to +10, and 0 to +5 VDC. Automatic initialization to 0 VDC is provided upon power-up.

Pulse Group Recognition Circuits

The Pulse Group Recognition Circuits 210 include logic for Command Address recognition and Interrogation Verification 1 (I/V1) generation. See FIG. 7. The time intervals for Address (A) to Frame (F) (Command Address) and Channel (C) to Range (I/V1) pulse position codes are programmed from the Decoder Processor 250 based on the Command Address switch setting and the format in use. All of these circuits are implemented using a shift-register delay line technique, wherein the first pulse of any pair is delayed until a short time before the nominal expected position of the second pulse and is used to generate a gate or "window" around the expected position of the second pulse. The A to F (address) and C to R interval recognition circuits uses a counter/memory implementation of a serial-in serial-out shift register. The F to C (channel) interval recognition circuits utilize a tapped shift register due to the requirement for detecting up to 16 different F to C interpulse time intervals generated by channel commutation.

For timing, the output of a 20 MHz oscillator is divided by two by a flip-flop whose Q output is further divided by two in a second flip-flop. The second flip-flop outputs two complementary 5 MHz square wave signals on its Q and $\overline{Q}$ outputs.

Figure 7:
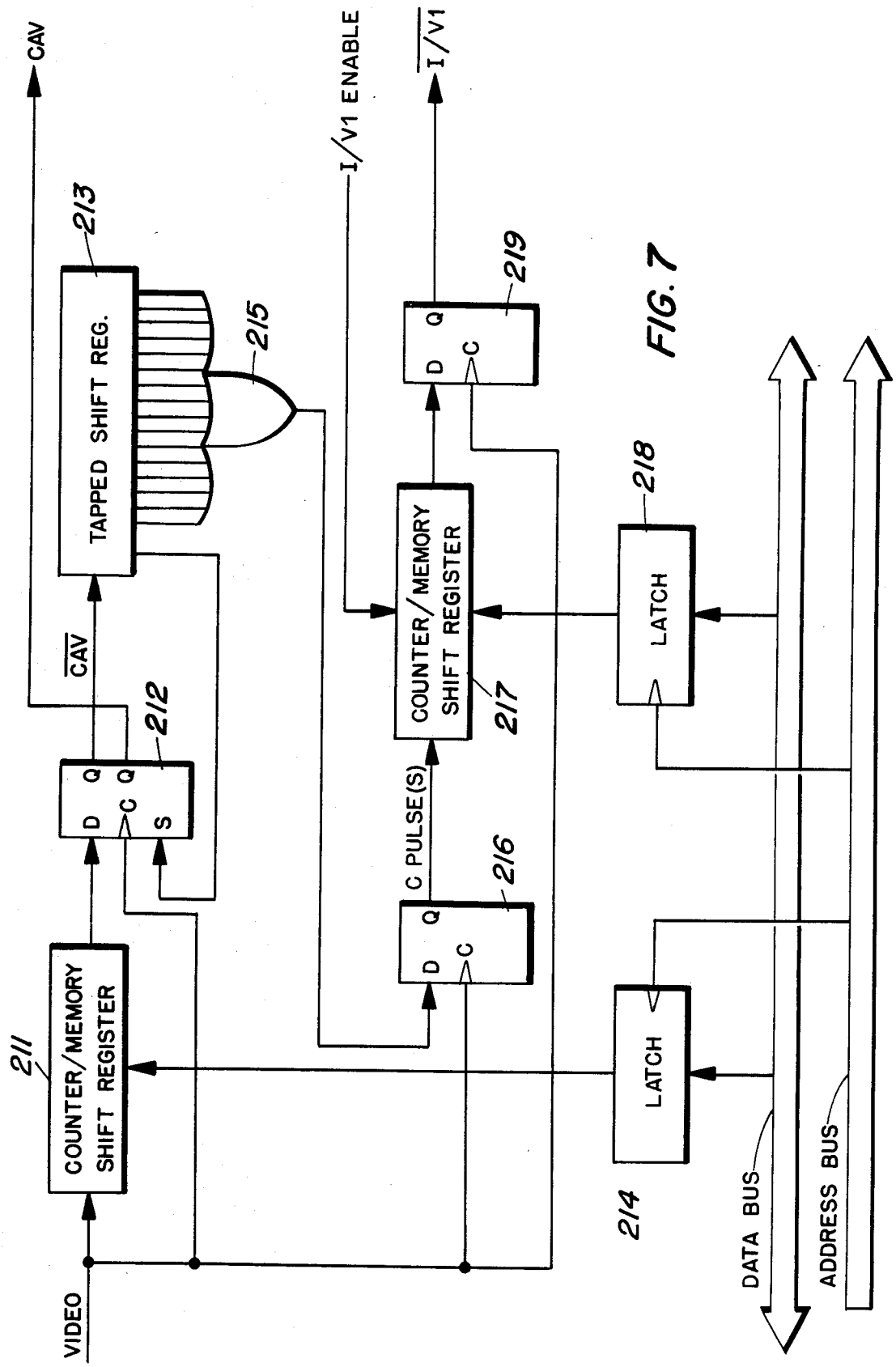
FIG. 7 is a block diagram of a portion of the decoder, the Pulse Group Recognition circuits.

The outputs of two counters provide address inputs to two RAMs in Counter/Memory/Shift Register 211 of FIG. 7. These counters are configured to count down in binary from a preset value to zero and then reload the number on their data inputs. This number is stored in register 214 by the decoder processor and is dependent on the vehicle address. The preset number "k" is one less than the number of states entered by the two counters, and thus the number of locations accessed in each of the RAMs is k+1.

The video signal is routed to the data inputs on the 5 RAMs. A one (or high logic level) represents a pulse, while a zero (or low logic level) represents the absence of a pulse. This signal is sampled every cycle of a 5 MHz clock by each RAM when the R/$\overline{\text{W}}$ control line goes from low (write)to high (read). Since, however, the RAMs are driven by complementary R/$\overline{\text{W}}$ control inputs, the video line is actually sampled at a rate of 10 MHz. Therefore the maximum delay from the leading edge of a video input pulse to the time that pulse is stored in one of the RAMs is 100 ns.

The RAM location in which a video pulse is stored is defined by the address input supplied by the counter associated with the RAM. The address changes as the R/$\overline{\text{W}}$ line for the counter goes high. If a video pulse was written into the RAM the last time the counter state was equal to the current counter state, the Q output of the RAM is a logic high.

After inversion, the 10 MHz clock will enter the low logic level into the first stage of the shift register. After four more cycles of the 10 MHz clock, the fifth stage output of the shift register will go low. This establishes the low output pulse width of any stage of the shift register at five cycles of the 10 MHz clock, or 500 ns.

The second (F) pulse of the PPC pulse pair can occur up to 200 ns before or after its nominal expected position. Since the video is sampled at a 10 MHz rate, there can be up to 100 ns additional delay beyond that for which the counter/memory/shift register circuit 211 is programmed. The window for the F pulse is therefore output anywhere from 300 to 200 ns before the nominal position of the F pulse, and since it is 500 ns wide, it ends from 200 to 300 ns after the nominal position of the F pulse. This window output is taken from the second stage of the shift register.

If the leading edge of the F pulse occurs while the F pulse window is open, the $\overline{\text{Q}}$ output of flip-flop 212 is clocked from low to high. This is the CAV output. Simultaneously, the Q output of flip-flop 212 goes low. This is the $\overline{\text{CAV}}$ output, which is used by the channel pulse detection circuits.

The CAV output is clocked into shift register 213 on the next rising edge of the 5 MHz phase 1 clock. Two cycles of this clock later, the third stage output of shift register 213 goes low, activating the set control input of flip-flop 212. This causes the $\overline{\text{Q}}$ output of 212 to go low and the Q output to go high, terminating the CAV pulse and limiting low logic level pulse input to register 213 to three cycles of the 5 MHz phase 1 clock, or 600 ns.

The 600 ns active-low pulse is clocked through shift register 213 at a 5 MHz rate. A total of 16 outputs are ORed together by gate 215 and input to flip-flop 216 as the channel pulse window. This window opens sixteen times around the expected positions of the C pulse with respect to the F pulse. Since the CAV signal is sampled at 5 MHz by shift register 213, there will be a variation of 200 ns peak in the position of the windows relative to the video input. The windows are opened between 400 and 200 ns before the expected positions of the C pulse and are closed from 200 to 400 ns after the nominal position of the C pulse.

If the leading edge of the C pulse occurs when a C pulse window is open, it will clock the Q output of flip-flop 216 from low to high. This output is sampled at a 5 MHz rate by a RAM which is part of counter/memory/shift-register circuits 217. This circuit is similar to that used for F pulse detection, circuit 211. Its address inputs are supplied by a counter configured as a binary down counter; it is reloaded, on the next clock edge after it reaches the all zeros state, with the contents of register 218. The data placed in register 218 by the Decoder Processor determines the pulse delay implemented by this counter/memory/shift-register circuit 217 and is dependent on the vehicle address.

The delayed C pulse appearing at the output of the RAM is clocked through the shift register if I/V1 ENABL is high. Since the shift register is clocked at 10 MHz, an 800 ns active-low pulse appears at the output of circuit 217. This signal is the R pulse window, timed to begin between 500 and 300 ns before the expected position of the R pulse, and end between 300 and 500 ns after this position. The C pulse to R pulse time interval is thus allowed a tolerance of ±300 ns. If the leading edge of the R pulse occurs within the window, when the D input to flip-flop 219 is high, the Q output of flip-flop 219 switches from high to low, outputting an active-low $\overline{\text{I/V1}}$ signal.

In summary, the Pulse Group Recognition Circuits 210 are designed to detect the command uplink pulse group. Command uplink detection begins with regonition of the command address upon detecting an F pulse at the proper interval following an A pulse and results in output of the CAV pulse. CAV is used to generate a series of 16 windows around the 16 possible positions of the C pulse relative to the F pulse. The result is the detected Channel pulse, which is delayed to generate a window around the expected position of the last pulse in the command uplink, the R pulse. When the leading edge of the R pulse falls within the window, $\overline{\text{I/V1}}$ is output (assuming I/V1 ENABL is high). This signal is used as a timing reference for the decoder 200.

Pulse Repetition Interval (PRI) Synchronizer Circuits

Figure 8:
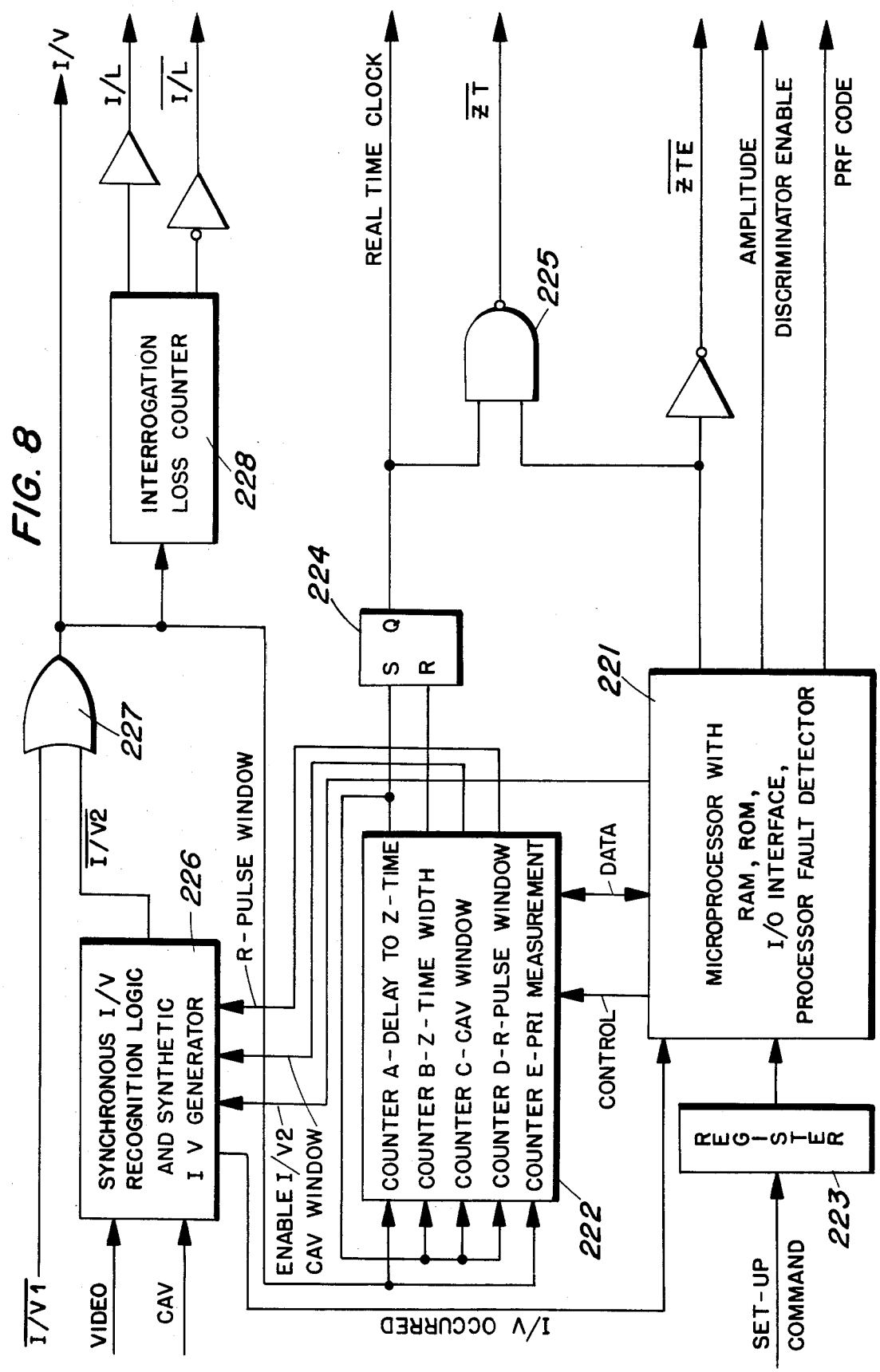
FIG. 8 is a block diagram of another portion of the decoder, the Pulse Repetition Interval Synchronizer circuits.

The PRI Synchronizer Circuits 220 provide timing and control signals used by the other decoder circuits. See FIG. 8. These signals are time-referred to the R pulse of each PRI. Synchronization is initially established using the $\overline{\text{I/V1}}$ output of the Pulse Group Recognition Circuits 210 as a reference. The PRI Synchronizer Circuits 220 then use the CAV signal from the Pulse Group Recognition Circuits and the R pulse to generate an $\overline{\text{I/V2}}$ signal to maintain synchronization, but periodically switch back to $\overline{\text{I/V1}}$ to verify synchronization using the C to R pulse interval.

The primary output of the PRI Synchronizer is the active-low Z-Time ($\overline{\text{ZT}}$) signal. This signal is active from about 25 us before the earliest A pulse (measured with respect to the R pulse) until about 3.5 us after the R pulse. $\overline{\text{ZT}}$ is generated only when valid five pulse command uplink pulse groups with the correct vehicle address are being received at one of the three valid Pulse Repetition Frequencies (PRFs), 500, 320, or 160. Associated with the Z-Time signal is the active-high Real Time Clock (RTC) signal, which has the same timing with respect to the received pulse group as the Z-Time signal. RTC is continuously output at the current measured PRF or last known PRF.

An Interrogation Loss signal is output from the PRI Synchronizer 220 for use by an antenna switch as an antenna change control signal. This signal is output in both active low ($\overline{\text{I/L}}$) and active high (I/L) states whenever an I/V1 or $\overline{\text{I/V2}}$ signal cannot be output for three consecutive PRIs; it is deactivated any time an I/V pulse is output.

Several miscellaneous control signals are output from the PRI Synchronizer. They include I/V1 ENABL, an active high signal that goes low to inhibit output of the I/V1 pulse during the decoder cycle; the active low Z-Time Enable ($\overline{\text{ZTE}}$) signal which enables the Z-Time generating circuit, its leading edge being used to trigger an initialization cycle in the Interference Processor Circuits 230; and a two-bit binary number which indicates which of the three available PRFs is being received. This information is used by the Decoder Processor 250.

The synchronizer 220 is controlled by a dedicated Z-80 microprocessor 221. The generation of timing signals which toggle the Z-Time and RTC signals, gating signals used to generate $\overline{\text{I/V2}}$, and measurement of the PRI are accomplished in a 9513 System Timing Controller 222 under control of the microprocessor. (The 9513 is manufactured by Advanced Micro Devices of Sunnyvale, CA.)

A four-bit binary counter divides the 20 MHz signal from the oscillator in the Pulse Group Recognition Circuits 210 to provide outputs at 5 MHz and 2.5 MHz. The 5 MHz signal is used by controller 222, pulse synchronizers associated with the controller, and pulse delay circuits comprising tapped shift registers. The 2.5 MHz signal is amplified and used to clock the Z-80 microprocessor 221.

The program memory for the processor 221 is a programmable read-only memory (PROM). This IC can store up to 2048 bytes (a byte is 8 bits) of instructions and data. The scratchpad (read/write) memory for the microprocessor is provided by a 1024-byte static random access memory (RAM).

Register 223 is used by decoder processor 250 to store information needed by processor 221, such as the number of channels in use, the vehicle address, and the size of the data window (8 or 10 bits).

The microprocessor software is synchronized to the hardware timing functions using the interrupt processing capability of the Z-80. When an interrupt request (the active-low $\overline{\text{INT}}$ input to the Z-80) is received, the processor begins execution of the software which controls controller 222 and other circuits.

The microprocessor 221 communicates with its program (PROM) and scratchpad (RAM) memory, controller 222, and register 223 using an eight bit bi-directional data bus. The microprocessor specifies the memory location or register it wants to access using a 16 bit address bus.

The controller 222 contains five 16-bit programmable counters, latches, and control circuits. The internal registers associated with each counter are addressed by an internal address register which can be loaded by the microprocessor 221. Also associated with each counter are source (clock), gate (trigger) and output terminals on the controller. Each counter is clocked at a 5 MHz rate. Counter D is clocked from the counter C source input. When the PRI Synchronizer is reset (for example, upon power-up), the microprocessor 221 computes several constants to be loaded into the controller 222 to generate timing signals referred to the command uplink R pulse. Counter A is programmed to count from the end of the nth Z-Time interval to the beginning of the n+1th interval. Counter B is programmed to count for the width of Z-Time. The terminal count outputs of these two counters are used to set and reset (respectively) flip-flop 224, the RTC and $\overline{\text{ZT}}$ output latch. The $\overline{\text{ZT}}$ signal, however, is ANDed with an active low enable signal in gate 225. Counter C is programmed to generate an active high pulse which begins just before the F pulse for the highest-numbered channel and ends just after the F pulse for the lowest-numbered channel. This pulse is called the CAV window and is used in the $\overline{\text{I/V2}}$ generating circuits 226. Counter D is programmed to generate an active high pulse called the R Pulse window which is nominally positioned 500 ns on each side of the leading edge of the command uplink R pulse. Counter E is used to measure the PRI, which is defined as the interval between successive I/V pulses.

There are three modes of operation programmed for the PRI Synchronizer: Acquisition, Track, and Coast. Acquisition Mode is entered following the power-up initialization process and whenever the command uplink signal is lost for several PRIs. In this mode, $\overline{\text{I/V1}}$ is enabled; $\overline{\text{I/V2}}$ and $\overline{\text{ZT}}$ are disabled. Track Mode is entered when two consistent PRI measurements are obtained, $\overline{\text{I/V2}}$ is now enabled except that $\overline{\text{I/V1}}$ is periodically enabled to check the C to R interval; $\overline{\text{ZT}}$ is also enabled. Coast Mode is entered from Track Mode if the I/V signal cannot be generated on a given PRI. No enable signals are changed in this mode. If I/V can be generated within two PRIs, Track Mode is reentered; otherwise Acquisition Mode is entered.

$\overline{\text{I/V2}}$ is generated as follows in I/V Generator 226: If I/V2 ENABL is high when the leading edge of RTC occurs, the reset on a D flip-flop is released. If CAV occurs during the CAV window, the Q output of the flip-flop will go high (and the $\overline{\text{Q}}$ output will go low), activating the set input so any further CAV pulses (which may be due to interference) will be ignored. If a video pulse leading edge occurs during the R Pulse window, the Q output of another D flip-flop will go low. This is the $\overline{\text{I/V2}}$ signal, which is terminated 600 ns later.

The $\overline{\text{I/V2}}$ signal is ORed in gate 227 with the $\overline{\text{I/V1}}$ signal to produce I/V, which, after suitable processing, triggers counters A and E of controller 222. An arrangement is also provided whereby the output of counter B may be used, if the I/V signal is unavailable, to trigger counters A and E. When I/V is present, however, it takes precedence.

An interrupt request flip-flop is activated by either the I/V pulse or the Counter B output in order to synchronize the software to the hardware timing. The software disables the Counter B output during Acquisition Mode so that only the delayed I/V pulse can initiate an interrupt request.

The Interrogation Loss outputs (I/L and $\overline{\text{I/L}}$) are generated by counter 228. This counter is reset whenever an I/V output is generated, and counts up by one at the end of the Real Time Clock interval, about 3.5 us after the R pulse is supposed to occur. If a count of four is reached, the I/L and $\overline{\text{I/L}}$ signals are activated. These outputs will be deactivated the next time an I/V output is generated.

In conclusion, it has been shown that the PRI Synchronizer Circuits generate timing and control signals, used by other circuits in the Decoder. These signals are in general referred to the I/V signal which is derived from the command uplink pulse group and is synchronized to the leading edge of the command uplink R pulse. The Z-80 microprocessor 221 controls the generation of most of these timing signals in conjunction with the controller 222.

Pulse Storage and Interference Processor Circuits

Figure 9:
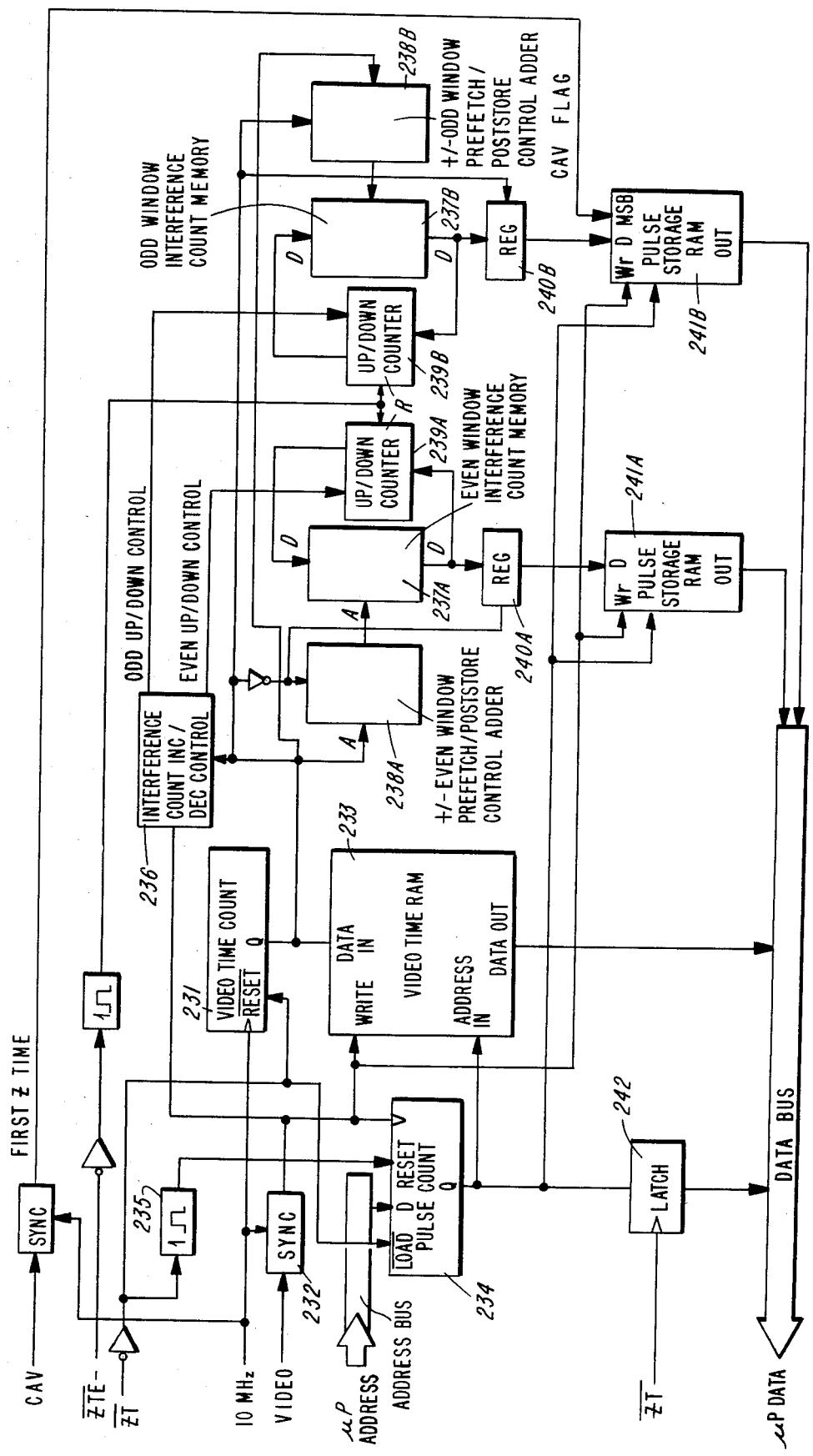
FIG. 9 is a block diagram of another portion of the decoder, the Pulse Storage and Interference Processor circuits.

The Pulse Storage and Interference Processor Circuits 230 record the time of arrival (TOA) of all video pulses which are received by the Decoder during Z-Time. These circuits also provide the capability of identifying possible synchronous interfering pulses, pulses which are fixed in position or nearly so with respect to the command uplink R pulse. The Decoder Processor 250 accesses the pulse TOA and interference information following Z-Time each PRI and decodes the PPC data for output. When synchronous interfering pulses are present, they are identified as such by the interference processor circuits and can be removed from the data during the decoding process. Refer to FIG. 9.

Pulse TOA and interference information are recorded only during Z-Time, while the Decoder Processor 250 is allowed to access the stored data between occurrences of Z-Time. Before the beginning of Z-Time, a twelve-bit binary counter 231 which provides the timing information for pulse TOA and for the interference processor circuits is reset. Counter 231 then counts up at a 10 MHz rate from the beginning to the end of Z-Time. When a video pulse is received, the contents of the counter, representing the TOA of the pulse, are stored in the lower twelve bits of a 256-word-by-twenty-bit memory. The upper eight bits of the twelve bit counter are used to define a sequence of up to 256 pairs[3] of 1.6 us wide "even" and "odd" interference windows. The information provided by the interference processor for each received pulse tells how many times in the last seven PRIs a pulse has appeared in each of the two interference windows in which it occurs. The two interference windows in each pair are offset from each other by 800 ns. Thus, if a synchronous interfering pulse is moving from one window into an adjacent window in one of the two windows that it is in, it will be in the center of the other window of the pair. Associated with each window is a three bit up-down counter. This counter is incremented by one each PRI up to a maximum count of 111 binary (7 decimal) if a pulse occurs within the window, and is decremented by one each PRI down to a minimum count of 000 if no pulse occurs within the window. The counts from each of the two windows in which a pulse occurs are recorded in six of the upper eight bits of the twenty bit wide pulse storage memory along with the TOA of the pulse. The most significant bit of this memory is set to one if the received pulse results in a CAV pulse output of the Pulse Group Recognition Circuits 220, i.e., if the pulse is identified as a possible command uplink F pulse. The remaining bit is not used.

[3]. The actual number of pairs of interference windows is equal to the width of the Z-Time active interval in microseconds divided by 1.6.

Video signals are applied to a video synchronizer circuit 232 which produces an active output pulse 100 ns in width, delayed no more than 100 ns from the leading edge of the video pulse, and synchronized to the 10 MHz clock.

The 10 MHz signal is applied to a 12-bit synchronous binary counter chain 231. This counter is held reset by the inverted $\overline{ZT}$ signal until the beginning of the active Z-Time interval. This counter chain supplies the pulse TOA information and control and timing signals for the interference processor circuits. When an active-low pulse is output from the video synchronizer, 256 word by twelve bit random access memory 233 is enabled to record the output of counter 231. The address in which the data are stored is supplied by eight-bit binary counter chain 234. At the beginning of Z-Time, this counter is reset to zero under control of one-shot 235. Counter 234 is incremented by one by the *trailing* edge of the synchronized video pulse output of synchronizer 232, stepping the address output to RAM 233 to prepare for the next video pulse.

The synchronized video pulse activates the set control input of two flip-flops, causing their Q outputs to go high. These two flip-flops record the occurrence of a video pulse in the two interference windows which are active. Their output states are transferred to two other flip-flops at the beginning of each new interference window, while the first two are clocked with a logic low on the input to initialize them for the next window.

Timing signals for the interference processor circuits are generated by interference count increase/decrease control 236. Every 1.6 us, a transition in counter 231 clocks a flip-flop in control 236, causing its $\overline{Q}$ output to go low. A shift register in control 236 is toggled at a 5 MHz rate. The first rising edge of this signal after the flip-flop is clocked enters the flip-flop's low $\overline{Q}$ output into the shift register. This causes the output of the first stage of the shift register to go low, activating the reset input of the flip-flop, causing its $\overline{Q}$ output to switch to the high logic state. On the next rising edge of the 5 MHz signal, the high level $\overline{Q}$ output will be clocked into the first stage of the shift register, while the low logic state previously in the first stage of the shift register will be moved to the second stage. Thus the low logic state is clocked through the shift register on successive rising edges of the 5 MHz signal, occupying one stage at a time. Six of the eight outputs of the shift register are used to control the updating of the "even" and "odd" interference window counters.

The positions of the interference windows are determined by the timing signals described above and by the address inputs to the interference counter memories, 237A and 237B. These 256 word by three bit RAMs store the interference counts for the "even" and "odd" interference windows respectively. The address inputs are manipulated and the timing signals are utilized to read out the interference count for each window during the 800 ns preceding the beginning of each window and to update the count during the 800 ns following the end of the window.

The address inputs to the interference count memories 237A and 237B are derived from the high-order eight bits of twelve-bit counter chain 231. The counter output is modified by full adders 238A and 238B, based on the state of counter 231.

The "even" interference windows can be numbered by the high-order eight bits of twelve bit counter chain 231, while the "odd" interference windows are numbered by adding one to the high-order eight bits of the counter chain; both the "even" and "odd" interference windows are numbered at the beginning of the window interval.

During the first 800 ns of an "even" interference window k, the address inputs to memory 237A are set to k−1 by adding 1111 1111 binary to the high order eight bits from counter 231 in adder 238A. Binary up/down counter 239A is then loaded with the contents of memory 237A location k−1 which is the interference count for the previous "even" interference window, under control of the timing signal output of control 236. This interference count is now incremented or decremented, depending on the presence or absence of a video pulse, when the trailing edge of the timing output of control 236 occurs. Counter 239A is connected to disable incrementing or decrementing the count if it is 111 to 000 binary respectively. The updated count is written back into memory 237A under control of the timing signal output of control 236.

During the second 800 ns of the kth "even" interference window, the address inputs to memory 237A are set to k+1 by adder 238A by adding 0000 0001 binary to the high order eight bits of counter 231. The interference count for the k+1th interval is applied to the data inputs of register 240A. At the beginning of the k+1th interval, the count is clocked to the Q outputs of register 240A by the rising edge of an inverted output bit of counter 231. This makes the interference count available to the pulse storage RAM 241A if a video pulse is received.

The "odd" interference window processing is handled almost identically to the "even" by adder 238B, memory 237B, counter 239B, and register 240B. The interference count is made available to pulse storage RAM 241B at the beginning of each "odd" interference window. The only major difference is the way the address inputs to memory 237B are manipulated. The output of counter 231 is not modified during the first 800 ns of the "odd" interference window, but is incremented by one during the last 800 ns as in the "even" interference window circuit. This difference is due to the 800 ns offset of the "odd" interference window with respect to the incrementing of counter 231, whereas the beginning of the "even" interference window interval is conincident with the instant at which counter 231 is incremented. The timing outputs of control 236 which control the "odd" interference count update are delayed 800 ns from their counterparts which control the "even" interference count update.

If the position of the command uplink pulse group within the PRI undergoes a step shift due to a change of command radars, the interference count information for the previous position of the uplink pulse group will be invalid for the new position. This necessitates the initialization of the interference counts stored in the interference processor RAMs. This is accomplished by detecting the active (low) going edge of the $\overline{ZT}$ enabling pulse, $\overline{ZTE}$. When $\overline{ZTE}$ goes low, the outputs of interference count memories 237A and 237B are disabled, while a logic low is placed on the inputs to up/down counters 239A and 239B. This simulates an interference count of 000 for all interference windows to initialize the interference window counts stored in memories 237A and 237B. Following this, normal operation is restored to the interference processor.

A flag bit is stored in the most significant bit of pulse storage memory 241B whenever a CAV pulse occurs, to aid the Decoder Processor 250 in identifying the F pulse. This bit is output from the Q output of a flip-flop clocked high by the leading edge of the CAV pulse. This flip-flop is reset within 200 ns.

When the active interval of Z-Time ends, and the $\overline{ZT}$ signal goes high, the pulse count output from counters 234 is stored in latch 242 by the trailng edge of the inverted $\overline{ZT}$ signal. The load input of counter 234 is now activated, allowing the Decoder Processor 250 address bus signals to pass through this counter to the pulse storage RAMs 241A and 241B and to the Video Time RAM 233. The processor 250 can now access the pulse TOA and interference count data.

In summary, the Pulse Storage and Interference Processor Circuits 230 provide a measurement of the arrival time of each video pulse which occurs during Z-Tiime and a pair of interference counts which indicate how many times a pulse has been received in preceding PRIs, or pulse trains, in the same approximate position. These data are utilized by the Decoder Processor 250 to decode the command uplink PPC data and to remove interference pulses from the data.

Decoder Processor

Figure 10:
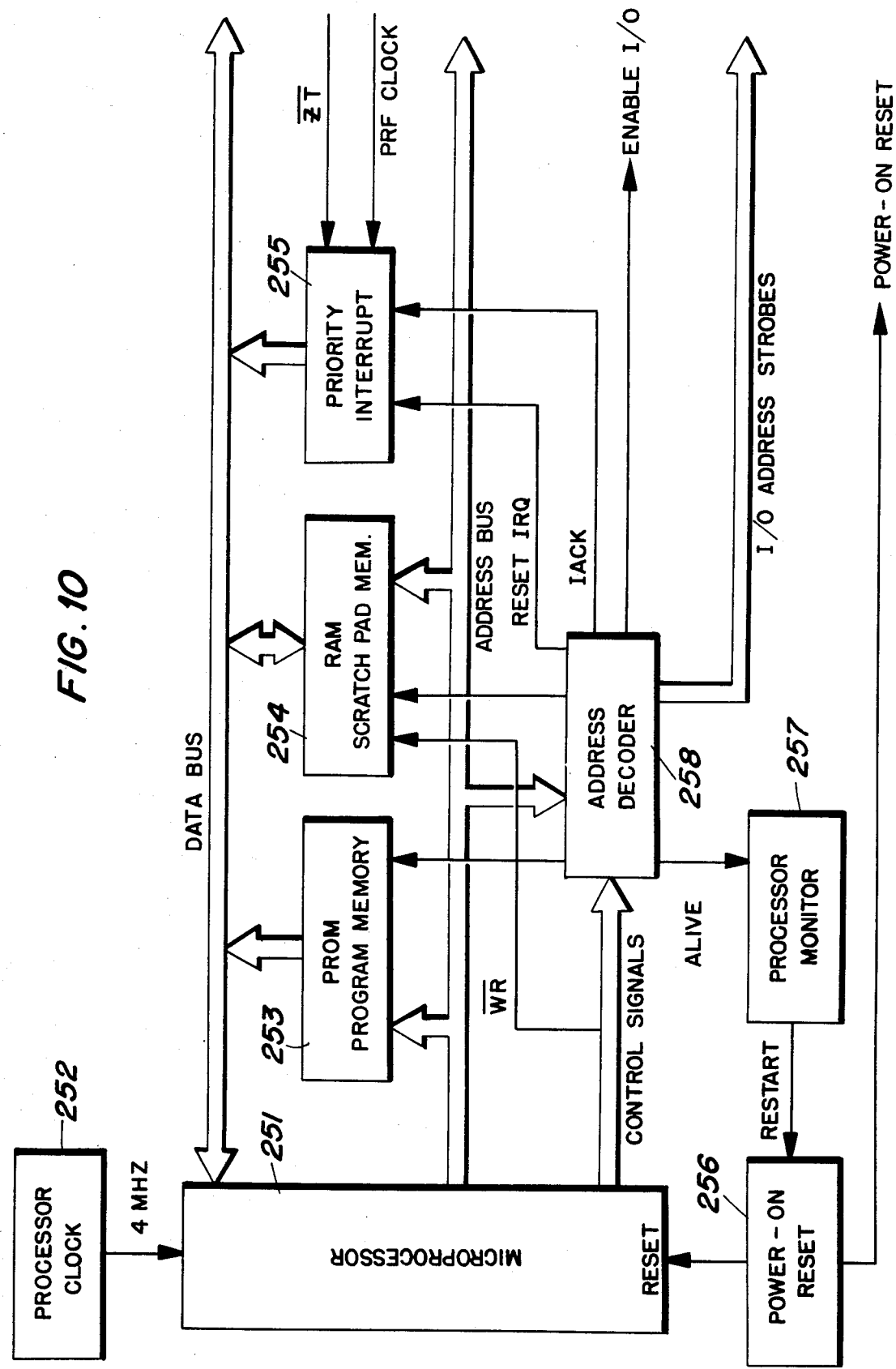
FIG. 10 is a block diagram of another portion of the decoder, the Decoder Processor.

The Decoder Processor 250 (see FIG. 10) is a Z-80A microprocessor-based microcomputer. Its function is to take the pulse time-of-arrival (TOA) and interference count data from the Pulse Storage and Interference Processor Circuits 230, decode the PPC data, and output the discrete and analog data values to the output interface circuits. A flowchart and program description for the software used to accomplish this task is provided below. The Decoder Processor Circuits include the Z-80A microprocessor 251, 4 MHz symmetrical clock generator 252, programmable read-only-memory (PROM) 253 for program and fixed information storage, random-access-memory (RAM) 254 for read/write scratchpad information storage, a priority interrupt circuit 255, a Dead Man's Switch circuit, and bus drivers and address decoders.

The processor clock logic circuits 252 divide the 20 MHz clock signal, provided by the Pulse Group Recognition Circuit 210, to provide a symmetrical (50-50 duty cycle) 4 MHz clock for microprocessor 251.

Power-on reset circuits 256 include a Schmitt trigger actuated by an RC delay circuit through a transistor. When power is first applied, the capacitor is charged through the resistor by the +5 VDC supply. When the voltage across the capacitor reaches approximately 3 VDC, the transistor is turned on. Schmitt-trigger action is provided to eliminate problems caused by the transistor's slow turn-on.

The active high reset signal in NORed with the output of processor monitor 257 to provide an active low reset signal to microprocessor 251. Monitor 257 comprises two retriggerable one-shots, the first of which is normally held retriggered by pulses output from address decoder 258 under control of the microcomputer software. If the microcomputer suffers a failure and the pulses are stopped, the first one-shot times out and the trailing edge of its Q output triggers the second. This outputs a pulse which is applied to the reset control input of the Z-80A through the NOR gate in an attempt to restart the microprocessor 251 program. Whenever the microprocessor reset control is activated, the program counter is reset to zero. The program is restarted at the beginning when the reset signal is deactivated.

The microprocessor 251 has the capability of addressing up to 65,536 ($2^{16}$) memory locations and up to 256 ($2^8$) input/output (I/O) locations. Each location normally contains eight binary digits (bits) of information. The microprocessor inpus data in a "read" cycle ($\overline{RD}$ active) and outputs data in a "write" cycle ($\overline{WR}$ active). Data transfers occur on eight bidirectional data lines, D0 through D7. The memory ($\overline{MREQ}$ active) or I/O ($\overline{IOREQ}$ active) address is specified by sixteen address outputs, A0 through A15. For I/O operations, only A0 through A7 are actually used to specify an address. The low-order twelve bits of the microprocessor address bus (A0 through A11), the $\overline{RD}$, $\overline{WR}$, $\overline{MREQ}$, and $\overline{IOREQ}$ signals, are buffered and routed to address decoders and other devices both in and outside of the Decoder Processor 250.

There are both I/O and memory address decoders included in decoder 258 of Decoder Processor 250.

The Decoder Processor eight-bit data bus is split into a local bus for circuits physically located within the Decoder Processor Circuit Card Assembly (CCA) and a remote bus for other circuits by two tri-state bus transceivers. These devices are enabled to transfer signals either to the local bus from the remote bus or in the opposite direction under control of the $\overline{RD}$ and $\overline{WR}$ signals respectively. When the Decoder Processor memory is accessed, in input data buffers are disabled, and the output data buffers are enabled. The data output is sustained slightly after the trailing edge of the $\overline{WR}$ signal.

Flip-flops are used to activate the $\overline{WAIT}$ control input to the Z-80A during an instruction op-code fetch cycle. This cycle involves reading one location of the program memory at a speed which would be too fast for the PROMs if the $\overline{WAIT}$ control was not used.

Two D flip-flops, a quad flip-flop, a priority encoder, and an octal latch comprise priority interrupt circuit 225. The purpose of this circuit is to accept interrupt request signals from multiple sources (up to four in the present case, although only two are fully implemented), generate a single microprocessor interrupt request by activating the $\overline{INT}$ control input to microprocessor 251, and to respond with an instruction to the microprocessor which identifies the device which first initiated an interrupt request when it performs an interrupt acknowledge cycle.

Interrupt requests from external devices are in the form of a leading edge of a pulse which clocks either of the two D flip-flops. When one of these flip-flops is clocked, its $\overline{Q}$ output goes low. This output is synchronized to the 4 MHz clock by the quad flip-flop, which outputs an active low signal to the priority encoder, which performs two functions: it outputs an active low signal to the $\overline{INT}$ control input of the microprocessor and a three bit code which identifies the active low input which has the highest priority. The three bit code is merged with five other bits, all of which are permanently wired to the high, or binary "1" state, in a latch. These eight bits, five fixed and three variable, form one (at a time) of eight possible "Restart" instructions in the microprocessor instruction set. When the microprocessor acknowledges the interrupt request, tri-state bus drivers are enabled to transfer the "Restart" instruction to the microprocessor, which then executes the interrupt service routine for the device which initiated an interrupt request. At the end of the interrupt service routine, the microprocessor executes an instruction causing the reset control input on the two D flip-flops to be activated, which terminates the interrupt request signal stored in the flip-flop.

Proportional Output Interface

The Proportional Output Interface 270 accepts twelve bit digital information from the Decoder Processor 250 and provide up to eight channels of analog voltage outputs which can range up to ±10 VDC and have a maximum resolution of 5 mV. The Decoder Processor 250 decodes eight or ten bit data based on the position of the D pulse and scales and offsets the data to provide the correct analog output range, which can be selected from −10 V to +10 V, −5 V to +5 V, −2.5 V to +2.5 V, 0 to +5 V, and 0 to +10 V. All of the analog outputs are preset to 0 VDC upon power-up.

The twelve bit data sent by the Decoder Processor are stored in a 16 word by 12 bit RAM. Eight of the RAM locations are used to store output data for the eight proportional output channels. The other eight locations are unused. The data stored are sequentially read out and transmitted to a 12 bit Digital to Analog (D/A) converter. The resulting D/A output voltage is transferred through an eight-line-to-one-line analog multiplexer to refresh one of the eight sample and hold (S/H) output amplifiers. The outputs of these amplifiers are the eight analog voltage outputs.

Each analog output is derived from a sample and hold output amplifier consisting of an operational amplifier and capacitor. Each sample and hold amplifier circuit is driven by the analog multiplexer which connects the D/A converter output to the capacitor only when the D/A is outputting the correct voltage for the selected proportional output channel. The digital data corresponding to the desired voltage output for the proportional outputs are stored in a 16 word by 12 bit RAM. These data are initialized to a value corresponding to a 0 VDC output for all outputs upon power up, and when decoding commences, are replaced by the values which will result in the desired output voltages. All eight sample and hold amplifiers are refreshed every 256 us to ensure that their capacitor charge is maintained at the correct level.

24 Bit Discrete Store/Output Interface

The 24 Channel Discrete Store/Output Interface provides 24 DPDT relay outputs for discrete data. The two poles of each relay are wired in parallel, providing a redundant contact pair. The COMMON, NO and NC terminals are brought out for each relay.

The Decoder Processor stores six bits of data in each of four hex registers, under control of the active low address strobe signals, Strobe 0 through Strobe 3. The resulting 24 bits of latched data are amplified by three octal drivers. These NPN darlington transistor drivers are used to ground one side of the relay coils when it is desired to energize the relays. The other side of each coil is connected to the 28 VDC supply. A suppressor diode for each relay driver is provided internally in the octal drivers. When the power on reset signal ($\overline{RESET}$) is active, all bits in the hex registers are cleared to zero.

DECODER SOFTWARE

System Description

The microprocessor decoder program has been designed in the form of modules. The powerful Z-80 microprocessor instructions are used in the implementation of the decoding program. There are a total of 10 modules included in this program. These 10 modules give the airborne decoder the ability to operate in an environment where different types of interference and noise are present and still maintain a secure data link between the drone and ground station. These ten modules are listed in Table 2 with their associated programs.

TABLE 2

| MODULES FOR DECODING SOFTWARE | |
|---|---|
| PROGRAM | MODULES |
| Power Up | POWERUP |
| Channel Tracking | CHTRACK |
| Decoding Processor | FPSRCH |

TABLE 2-continued

| MODULES FOR DECODING SOFTWARE | |
|---|---|
| PROGRAM | MODULES |
| | CRPSRH |
| | CFSRCH |
| | DDSRCH |
| | PDSEARCH |
| | PCSEARCH |
| | OUTPUT |
| Idle (waiting loop) | IDLE |

Figure 11A:
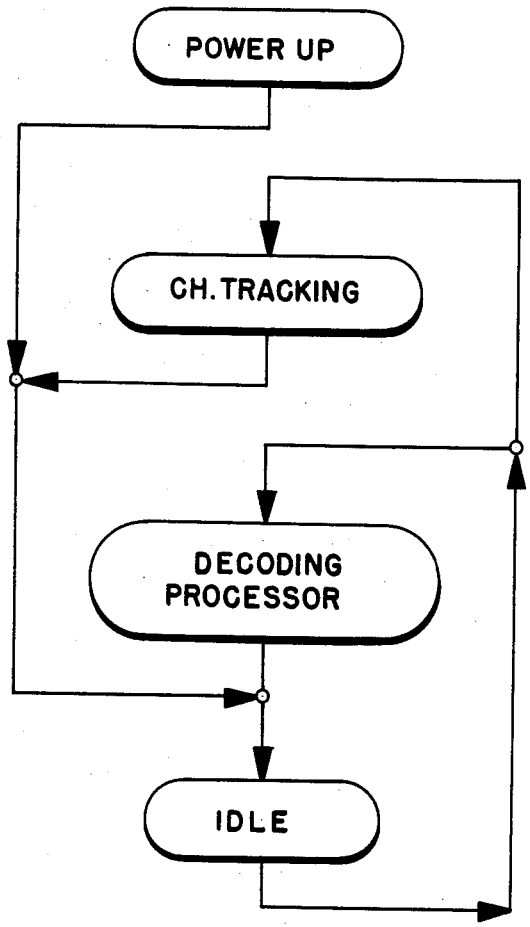
FIGS. 11A through 11S are flow charts illustrating the operation of the decoder software.

FIG. 11A shows the top-level system flowchart. The system-level program flow consists of four states: power-up, channel tracking, decoding processor and idle. The program POWER UP is activated and executed as soon as the power is turned on. At the end of execution of this module, if no interrupt is detected, the program control is given to the waiting loop called IDLE. Interrupt either from the real time clock (RTC) or the end of Z-time will transfer the program execution to CH TRACKING or decoding processor, depending on the type of interrupt. The module CH TRACKING is activated by the RTC interrupt and executed every PRI. After execution of CH TRACKING, program control is given to IDLE, waiting for further interrupt. The END Z-TIME interrupt will activate the decoding processor and execute the main decoding program. If no Z-time occurs in hardware, the decoding processor program will not be executed and the program executon will stay in IDLE. After finishing the execution of decoding processor, the module IDLE is again executed to wait for further interrupt. The top-level program flow for each state will be described in the following sections.

A. Power Up Program

Figure 11B:
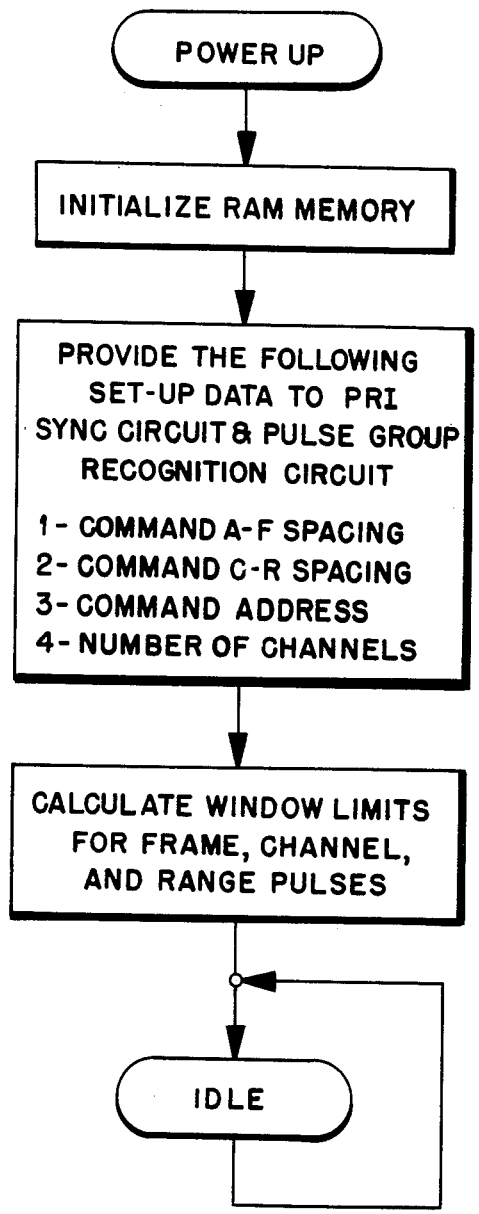

This module serves as a background task. It not only initializes RAM memory but also calculates various window limits for pulses and spacings between pulses. The setup data for pulse group recognition circuitry 210 and PRI synchronizer circuitry 220 are also provided by this module. The main waiting loop for interrupt is included at the end of this module. The program flow is shown in FIG. 11B.

B. Channel Tracking Program

Channel tracking (CHTRACK) program is activated by the real time clock (RTC) interrupt which occurs each PRI no matter whether the decoding processor program is executed or not. Because of this, the channel tracking number in this module is sequentially incremented by one, for each PRI, in the order of 1, 2, 3, .. ., 15, 16, 1, 2, 3, ... (modulo 16). As soon as the channel tracking number is initialized or reinitialized, the matched channel number and channel tracking number will be checked for at least 16 PRI in order to reach the state of confirmed decoding. In the unconfirmed decoding state, there is no updated output for any channel. During the recovery period from the unconfirmed to the confirmed state, the channel tracking number may be reinitialized in case there is no matching between channel number and channel tracking number. As long as the decoding processor is in the confirmed state, any mismatching between channel number and channel tracking number will result in no updated output for channels specified by unmatched channel numbers. If the decoding processor is in the confirmed state and if either the channel or the range pulse is undetected, the valid channel number may be confirmed by checking channel tracking number and detected channel or range number. If channel tracking number is equal to the detected channel or range number, the detected channel or range number will be used as a valid channel number. The flowchart for channel tracking is shown in FIG. 11C.

C. Decoding Processor Program

Figures 11C, 11D:
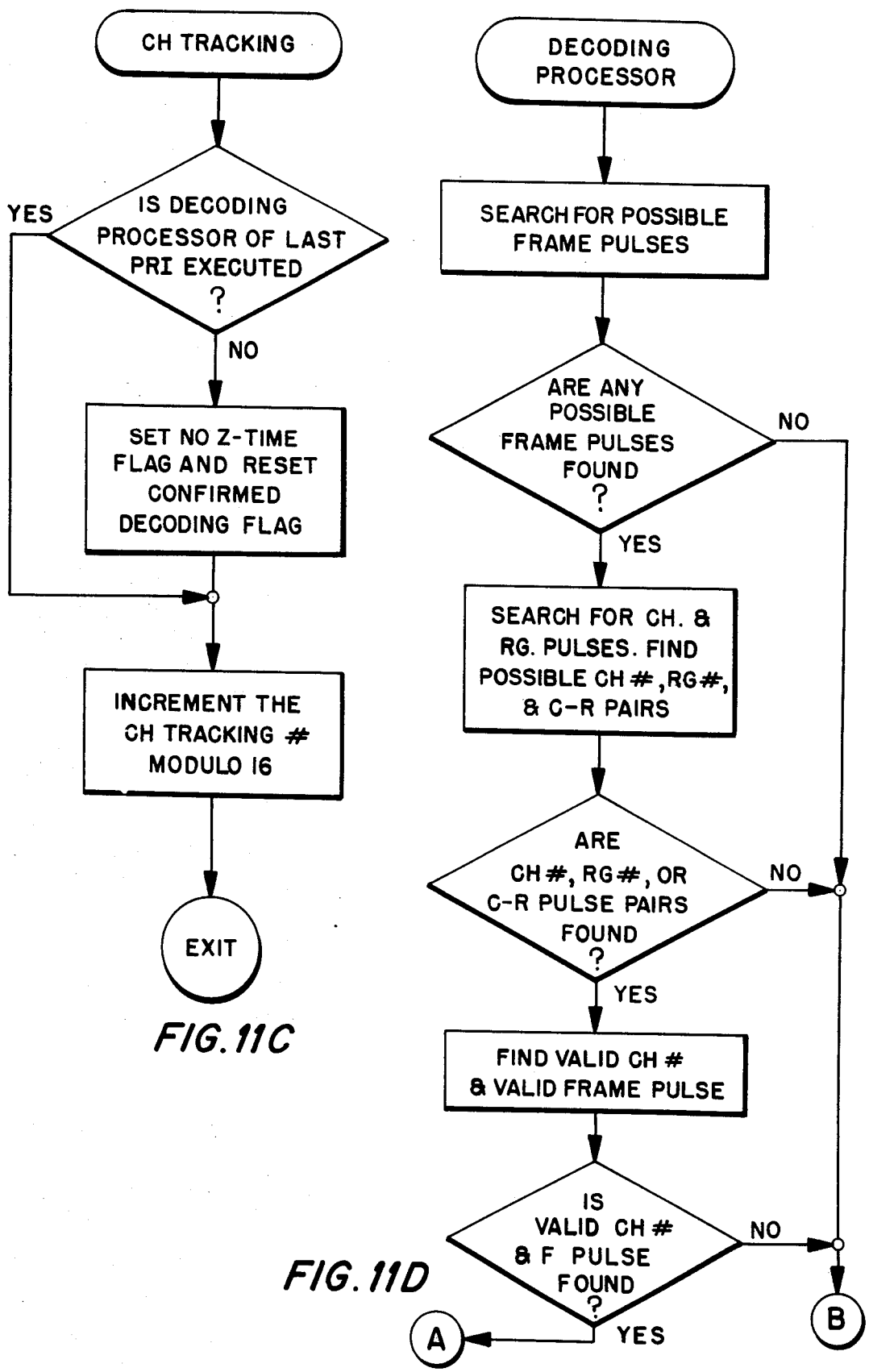
Figure 11E:
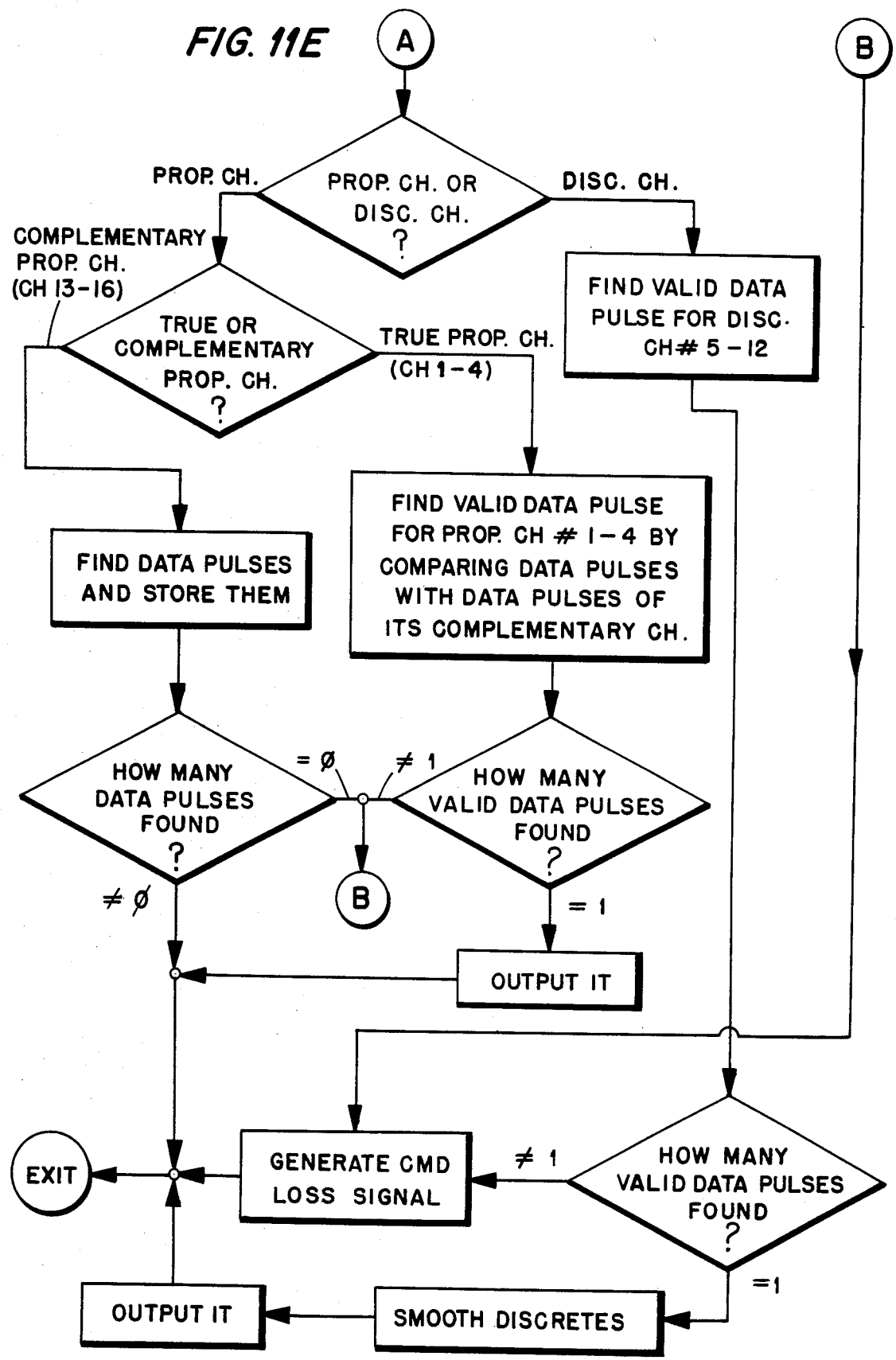

FIGS. 11D and 11E contain the top-level flowchart for decoding software. As shown, the decoding program consists of seven modules. They are listed in Table 3 with their functions.

TABLE 3

| MODULES AND THEIR FUNCTIONS FOR DECODING PROCESSOR | |
|---|---|
| MODULE | FUNCTION |
| FPSRCH | Find possible frame pulses. |
| CRPSRH | Find channel and range pulses, calculate channel and range number, and find C-R pulse pairs. |
| CFSRCH | Find valid channel number and frame pulse. |
| DDSRCH | Find valid data pulse for discrete channels. |
| PDSEARCH | Find valid data pulse for true proportional channels. (CH#1-4). |
| PCSEARCH | Find data pulse for complementary proportional channels (CH#13-16). |
| OUTPUT | Contains subroutines used to smooth discretes and to output proportional and discrete data. |

The main objective of the decoding processor program is to find the valid 5-pulse uplink command in an environment full of numerous synchronous and asynchronous interfering pulses and other noise. In order to achieve this goal, three important concepts have been adopted in the decoding processor system. One concept is to use interference windows built into decoding system hardware. The interference windows keep track of how many times the pulses, with approximately the same arrival time referenced to the beginning of Z-time, appear in the same interference window in sequential PRIs. The decoding processor software checks the interference count of each pulse to determine whether it is a valid pulse. Another concept is to set up software window limits around predicted pulses, including the frame pulse, channel pulse, range pulse and data pulse. The window concept increases decoding effectiveness. The third concept is to use the complementary data pulses of channels 13-16 to confirm the valid data pulses of true proportional channels 1-4. The data pulses of channels 13-16 are the complemented data pulses of channels 1-4, respectively. Using this true/complementary concept for proportional data pulses greatly reduces the probability of error.

The decoding processor program is activated by the END Z-TIME interrupt. During execution of the decoding program, it reads pulses stored in interference memories and analyzes them. As shown in the flowchart of FIGS. 11D and 11E, the decoding program searches and stores the possible frame pulses, channel pulse, and range pulse. For each possible frame pulse, channel number and range number are calculated from the possible channel pulse and the possible range pulse, respectively. Lookup tables are used to facilitate the calculation of channel number and range number. The channel number is compared with range number in order to find C-R pulse pairs. The valid channel number is found by comparing channel tracking number with channel number or range number or the channel number of C-R pulses pairs. Knowing the valid channel number, the valid frame pulse can be found. The decoding program then begins to search for valid data pulses. Separate modules are used to find valid data pulses for discrete channels, true proportional channels (CH#1-4), and complementary proportional channels (CH#13-16).

For discrete channels, the valid data must be smoothed for four consecutive PRIs before output is updated. For true proportional channels, the valid data pulse is confirmed by comparing each data pulse with data pulses of its complementary channel. The confirmed valid data pulse is converted to 12-bit data for output to the decoding hardware's D/A converter. For complementary proportional channels, the program searches for possible data pulses and stores them for later use to confirm the valid data pulses for their corresponding true proportional channels. (There is no output for complementary proportional channels). The command loss signal may be generated if no valid channel number or frame pulse, or valid data pulse, is found.

D. IDLE Program

Program IDLE is a very short routine. It waits for interrupt from either the real time clock or the end of Z-time in order to jump to the channel tracking or decoding processor programs. The IDLE program will be executed after execution of the power-up program, the channel tracking program, or the decoding processor program.

Module-Level Description of Decoding Processor Software

The following sections will describe the modules used in decoding processor program.

A. FPSRCH

Figure 11F:
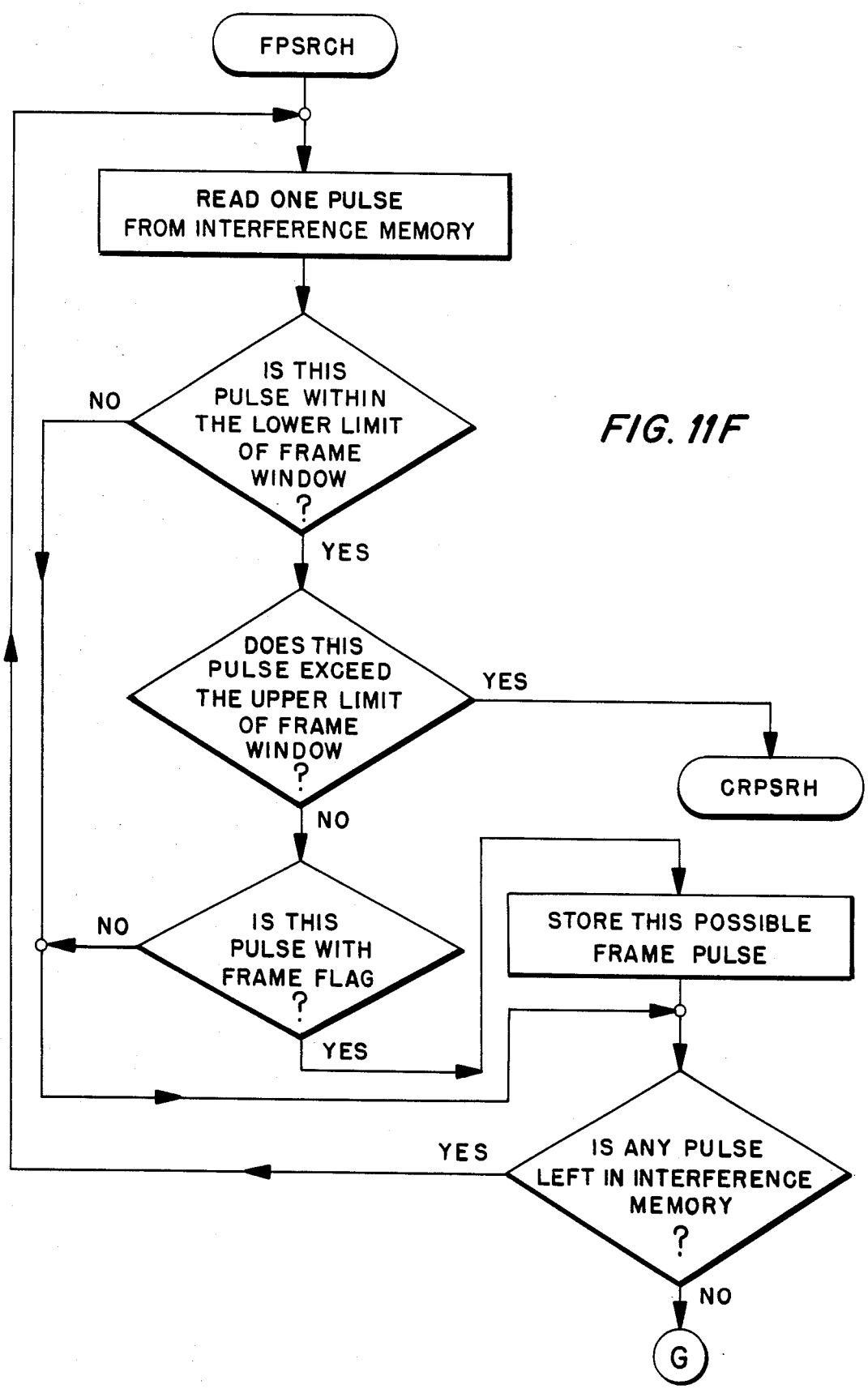

The objective of this module is to search for possible frame pulses and store them. The frame pulse has a frame flag on bit 7 of its interference count. This program distinguishes frame pulses from other pulses by testing bit 7 of the interference count of pulses within the frame pulse window. The flowchart for FPSRCH is shown in FIG. 11F. This module reads pulses from interference memories and discards any pulses which are in a time position ahead of the frame pulse window. It examines bit 7 of the interference count for pulses within the F pulse window; and if bit 7 (F-FLAG) is set, the program saves the pulse. All pulses within the frame-pulse window but without a frame flag will be eliminated.

B. CRPSRH

Figure 11G:
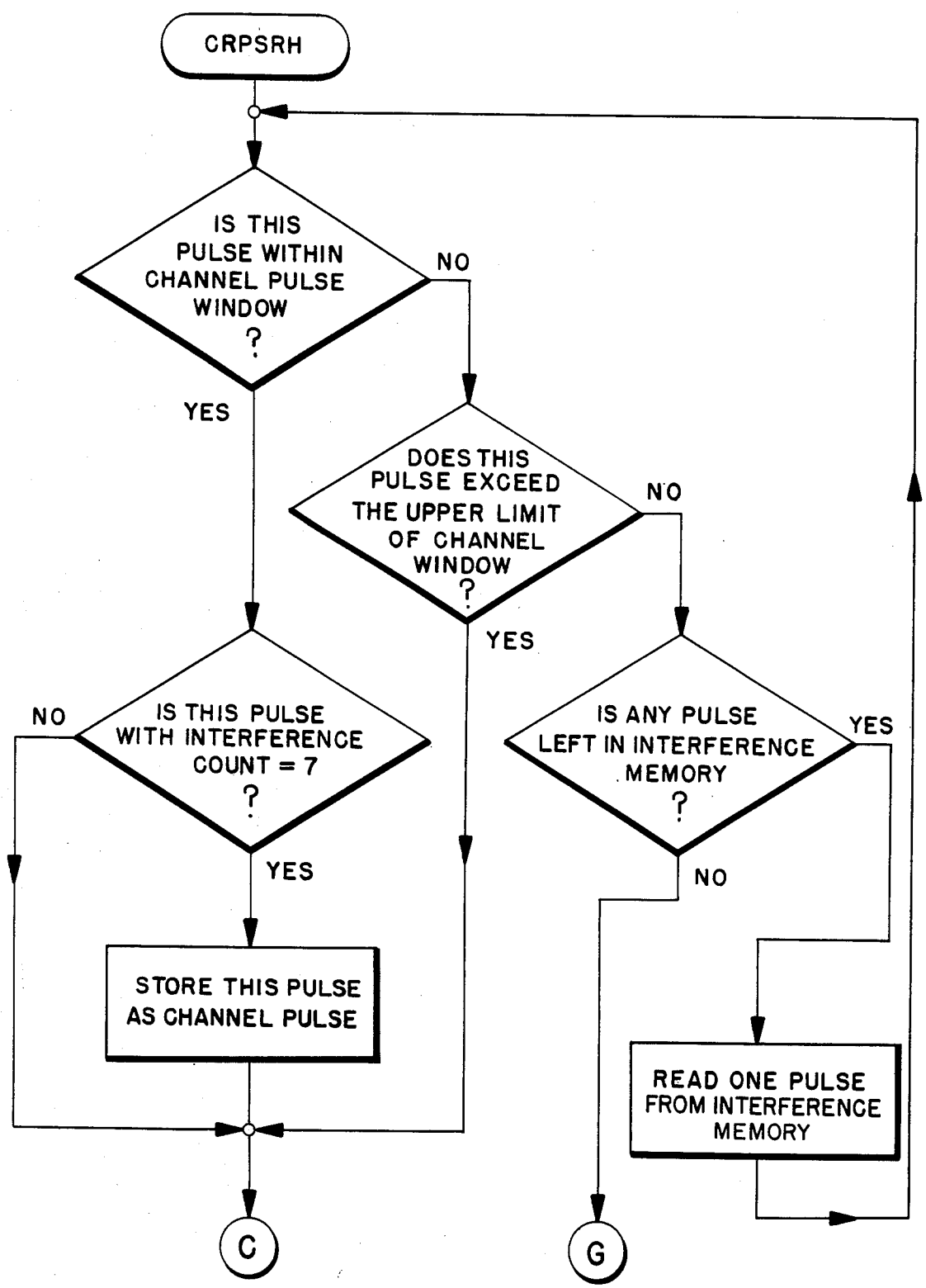
Figure 11H:
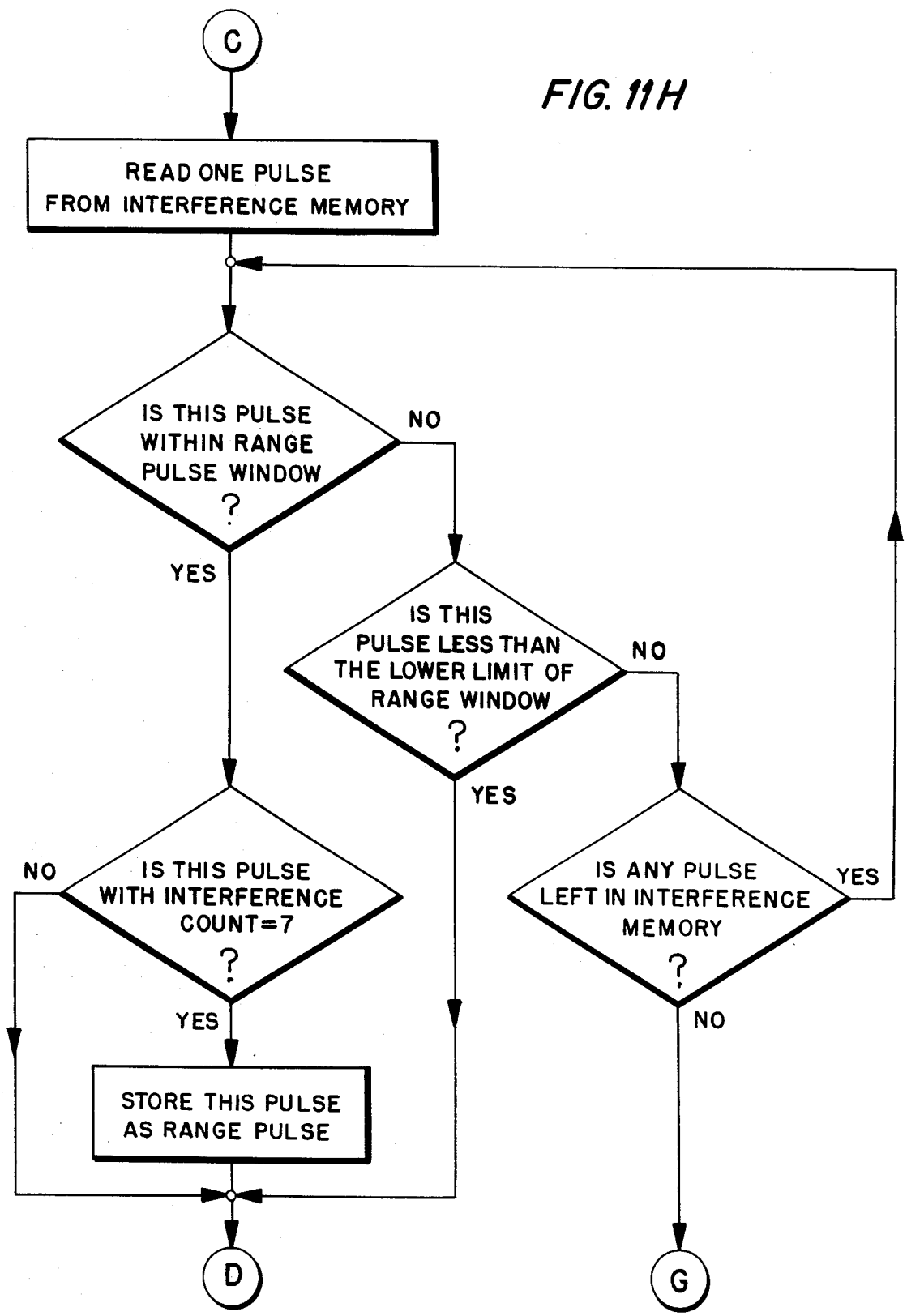
Figure 11I:
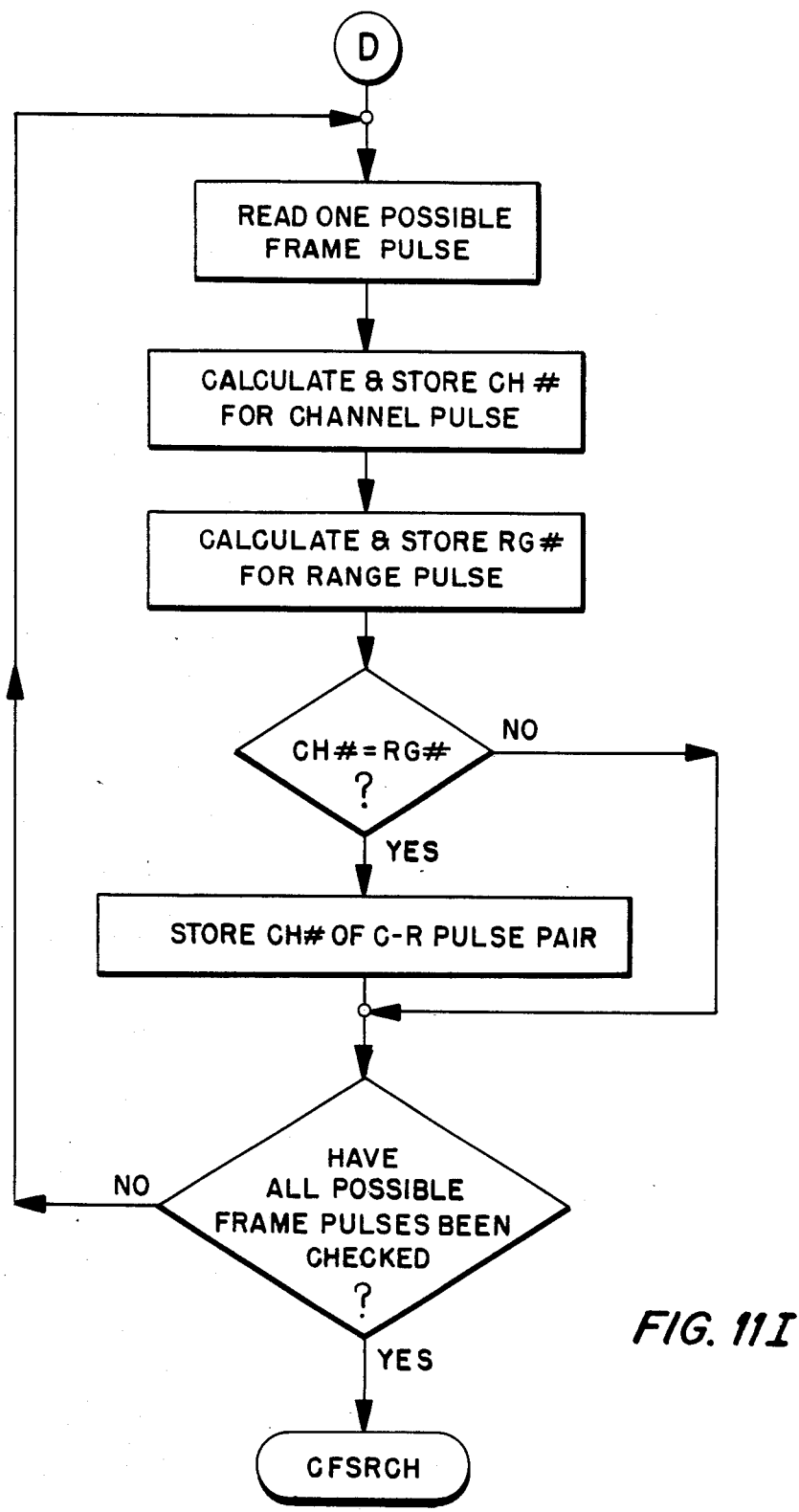

The purpose of this module is to search for a possible channel pulse and a possible range pulse, to calculate channel number and range number for each possible frame pulse, and to find a channel number for matched C-R pulse pairs. Both channel pulse and range pulse are standing pulses in relation to Z-time. From the interference concept, they are standing pulses; and each pulse must have the maximum interference count (7) in at least one of its dual interference windows. The flowchart for this module is shown in FIGS. 11G, 11H, and 11I. After executing module FPSRCH, the program continues to read pulses from interference memories and search for a pulse which is within the narrow channel pulse window. If a pulse is found there, its interference count is further examined to determine if it is a possible channel pulse. The program will eliminate a pulse within the channel pulse window if its interference count is less than 7.

After finishing its search for the channel pulse, the program continues to search for a possible range pulse. The range pulse must have an interference count equal to 7 in either of its dual interference windows. The program reads pulses from interference memories and searches for a pulse which is within the narrow range pulse window. The interference count for a pulse within the window is further checked to see whether it is a possible range pulse. If it is a possible range pulse, the program stores it. With the possible frame pulses, channel pulse, and range pulse available, the program proceeds to calculate the channel number of the channel pulse and range number of the range pulse for each possible frame pulse. The channel number is further confirmed by comparing it with the range number. If channel number equals range number, the program stores the confirmed channel number for this C-R pulse pair. The program may store several confirmed channel numbers. However, only one confirmed channel number will be found to be a valid channel number for a valid uplink command, because of the channel tracking counter.

C. CFSRCH

Figure 11J:
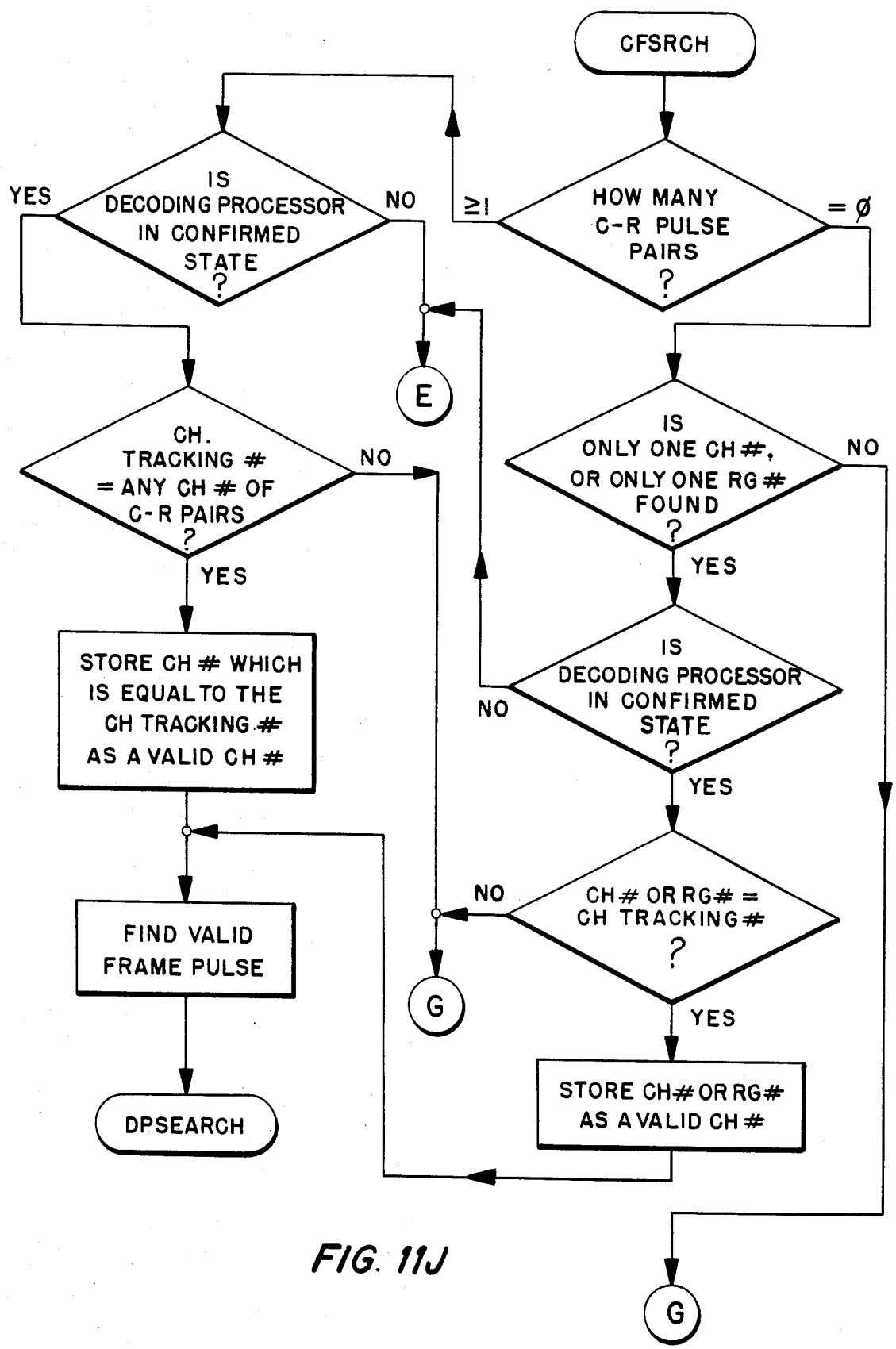
Figure 11K:
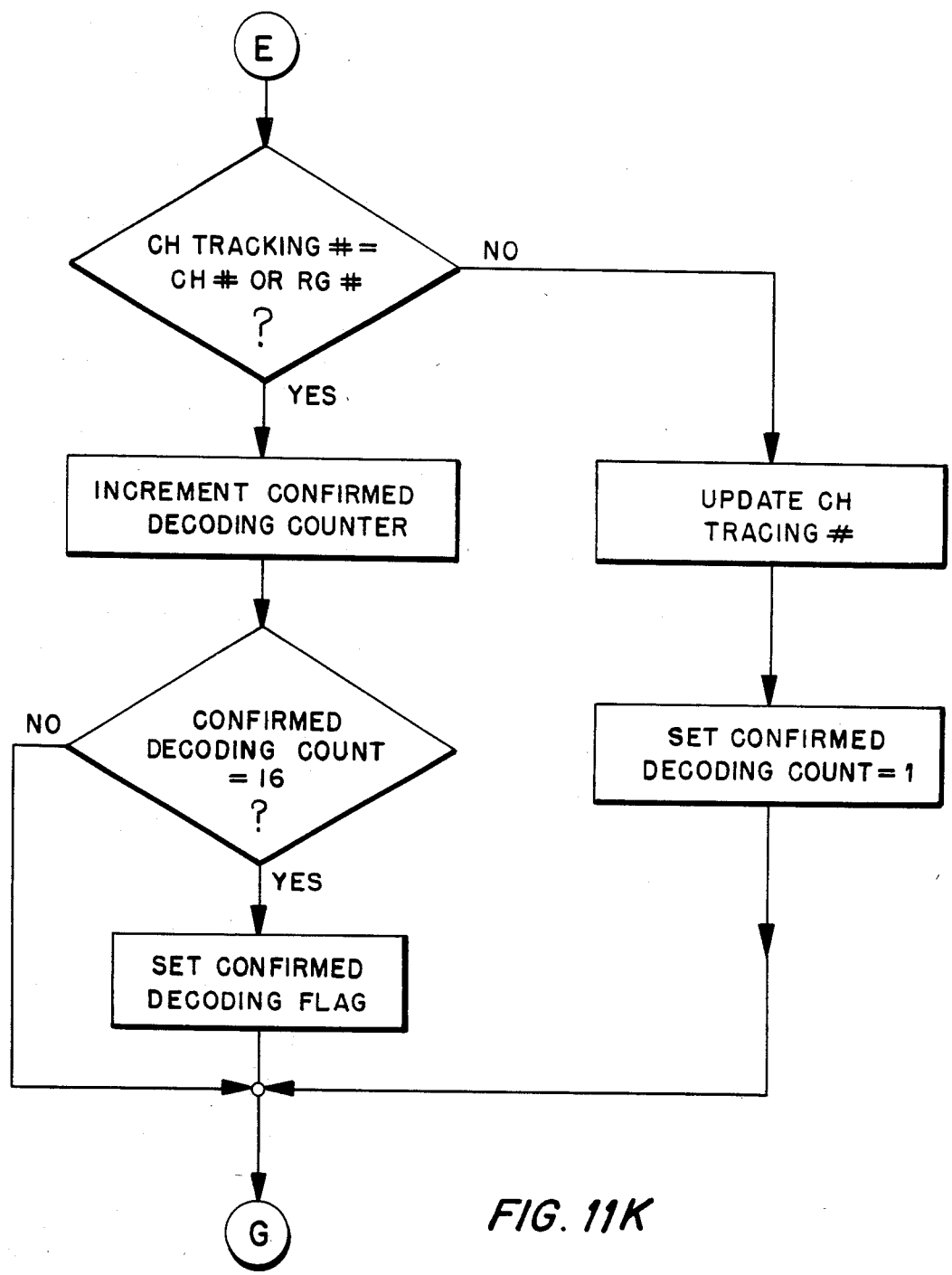
Figure 11L:
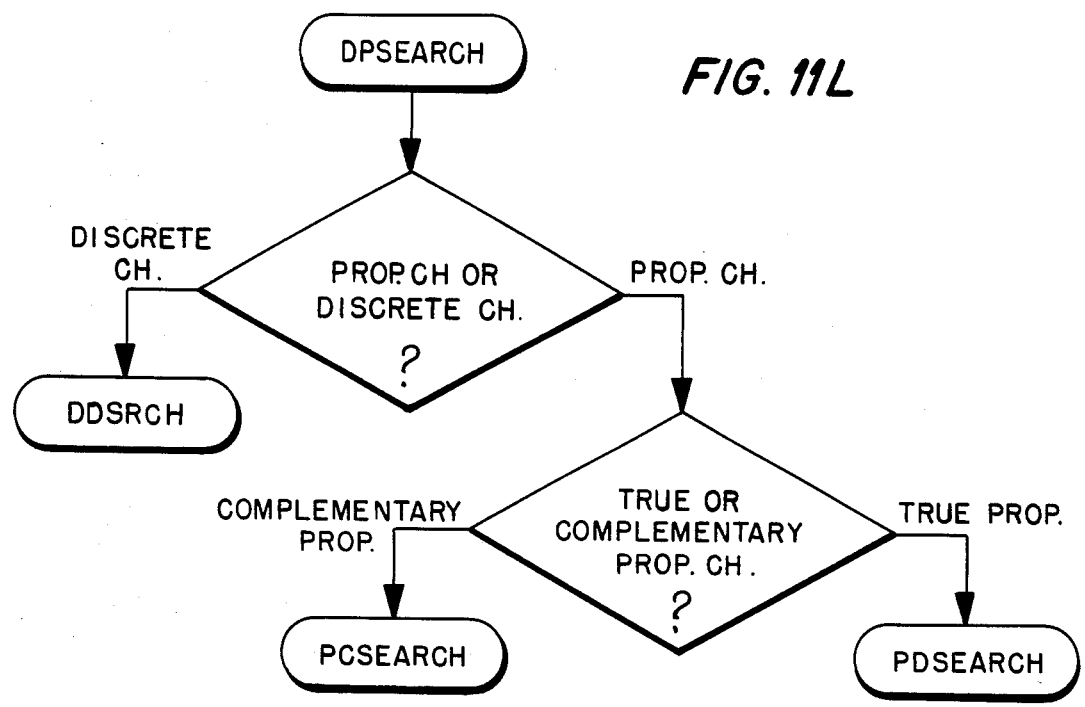

The main function of this module, shown in FIGS. 11J and 11K, is to find the valid channel number and valid frame pulse for a command uplink pulse group. In the case of several confirmed channel numbers found in module CRPSRH, the program further searches for the valid channel number by comparing each confirmed channel number with the channel tracking number if the decoding processor is in the confirmed state. The confirmed channel number which is found equal to the channel tracking number will be considered as a valid channel number. If either channel number or range number is undetected, and if the decoding processor is in the confirmed state, the valid channel number can be verified by comparing the detected channel number or range number with channel tracking number. If either the detected channel number or range number equals the channel tracking number, this channel number or range number will be considered as the valid channel number. After finding the valid channel number, the program can easily distinguish the valid frame pulse from all possible frame pulses; it is the one from which the valid channel number is derived. The valid frame pulse will be used as a reference pulse for data pulse search.

D. DDSRCH

Figure 11M:
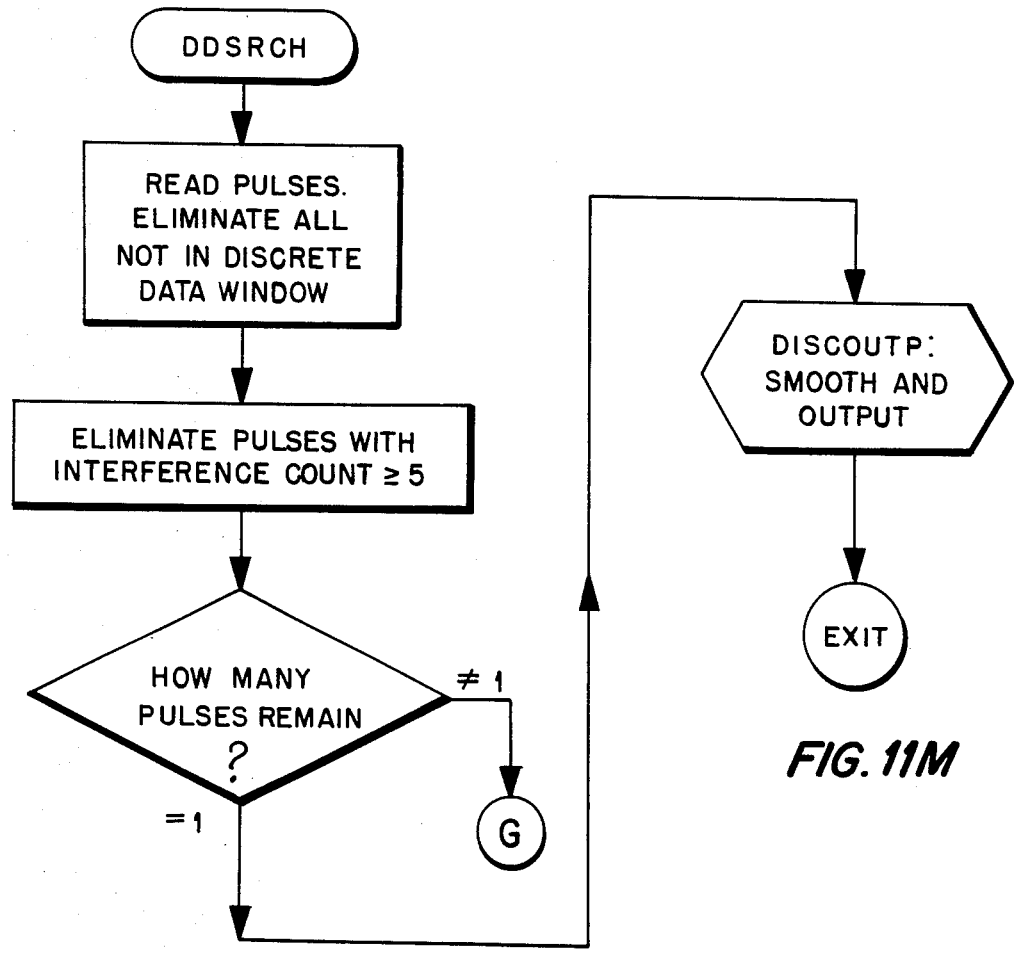

This module is used to find the valid discrete data pulse (for channels 5 through 12). For discrete channels the valid data pulse must be within one of the discrete time slots. Each time a pulse is read from interference memory, the program examines it to determine if it is within one of the discrete time slots. All data window pulses which are not within discrete time slots will be eliminated. If a data pulse is found within a discrete time slot, its interference count is further examined. An interference count greater than 4 in either interference window indicates that this pulse should be discarded. After this elimination process, the only pulses left in the data window will be those pulses which are within discrete time slots and have interference counts less than 5. The number of data pulses left is finally checked by this module. If one and only one data pulse exists, the program will consider this data pulse as the valid discrete data pulse and proceed to smooth and output it by executing subroutine DISCOUTP. More than one, or zero, pulses remaining in the data window may cause generation of the command loss signal due to ambiguity in the discrete channel. The flowchart for this module is shown in FIG. 11M.

E. PDSEARCH

Figures 11N, 11O:
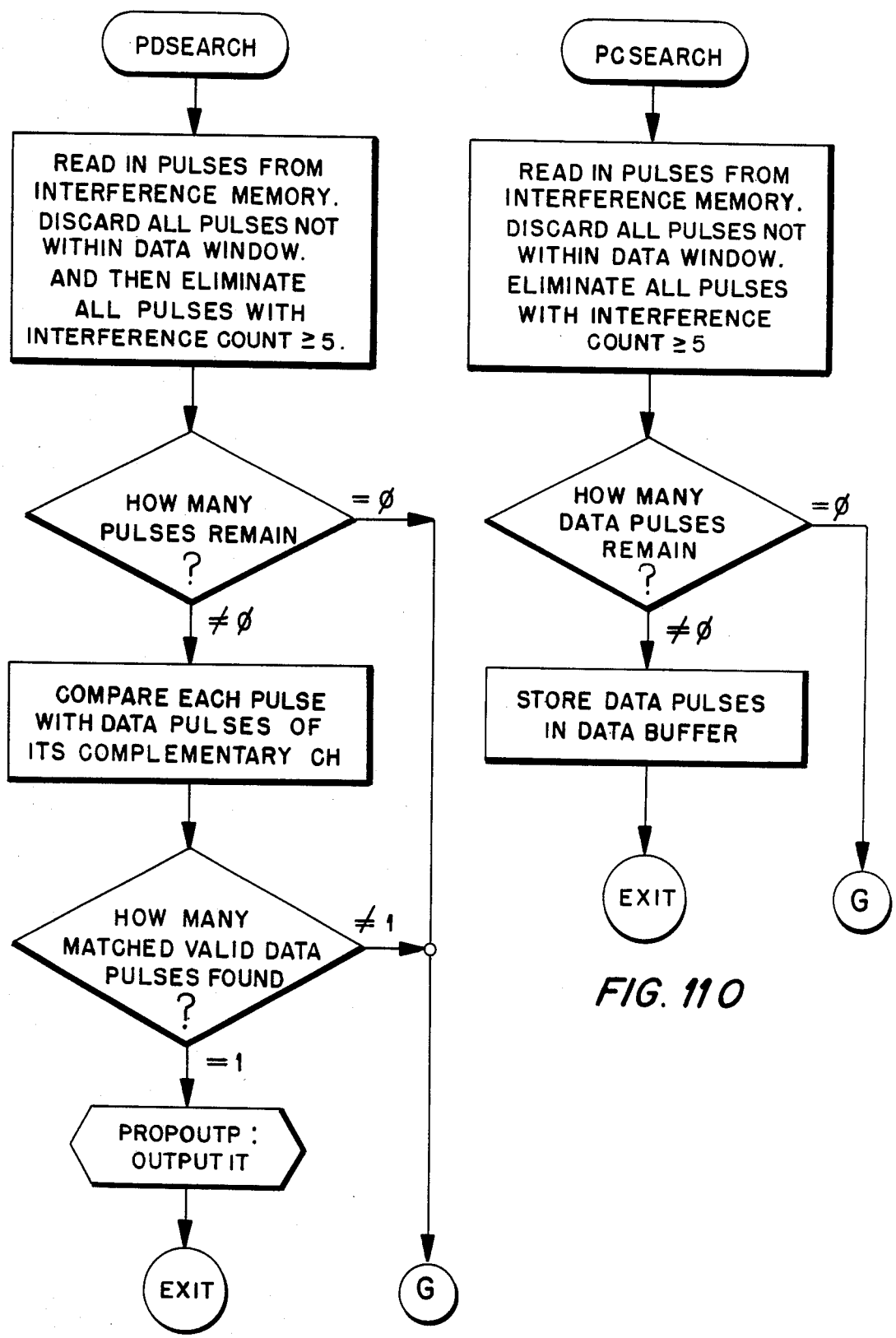
Figure 11P:
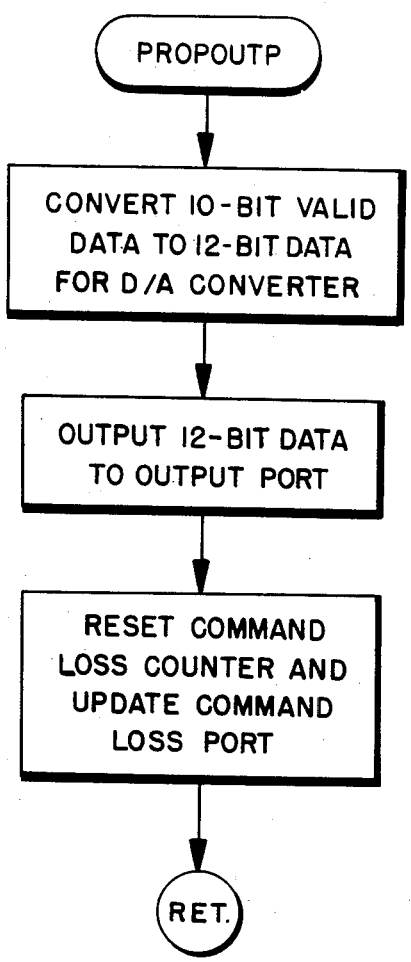
Figure 11Q:
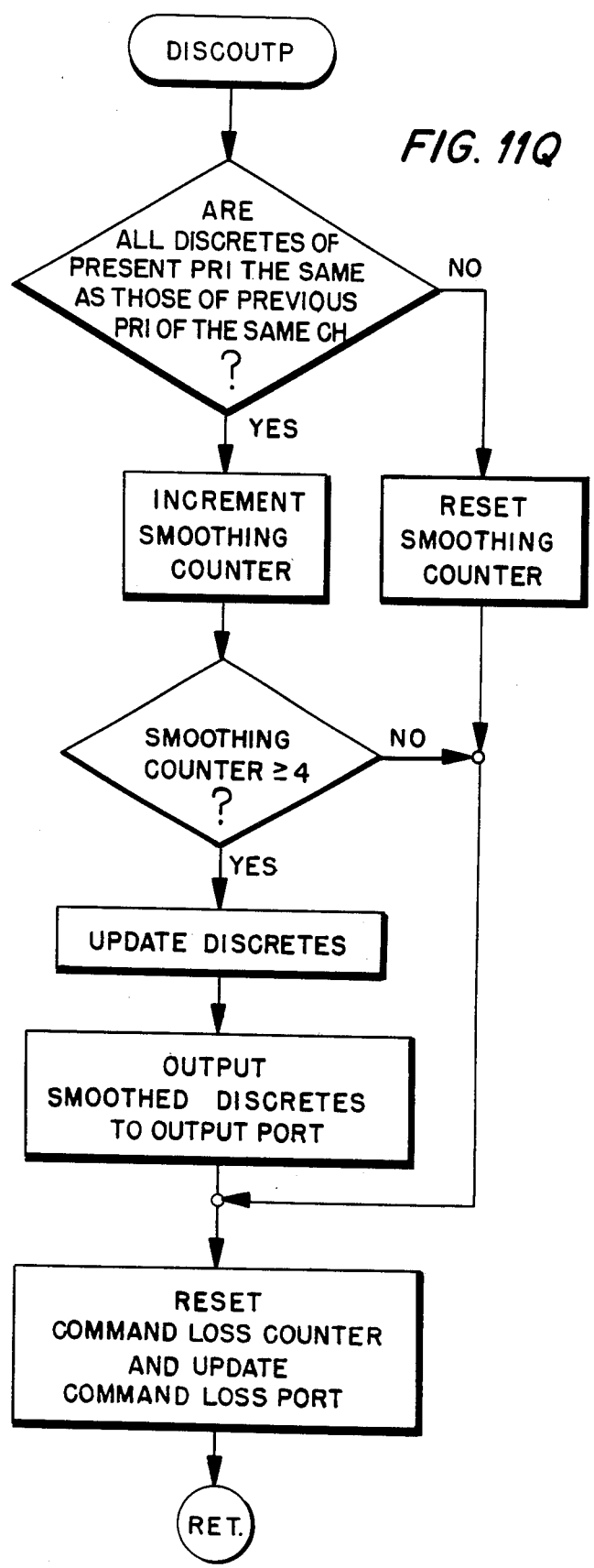
Figures 11R, 11S:
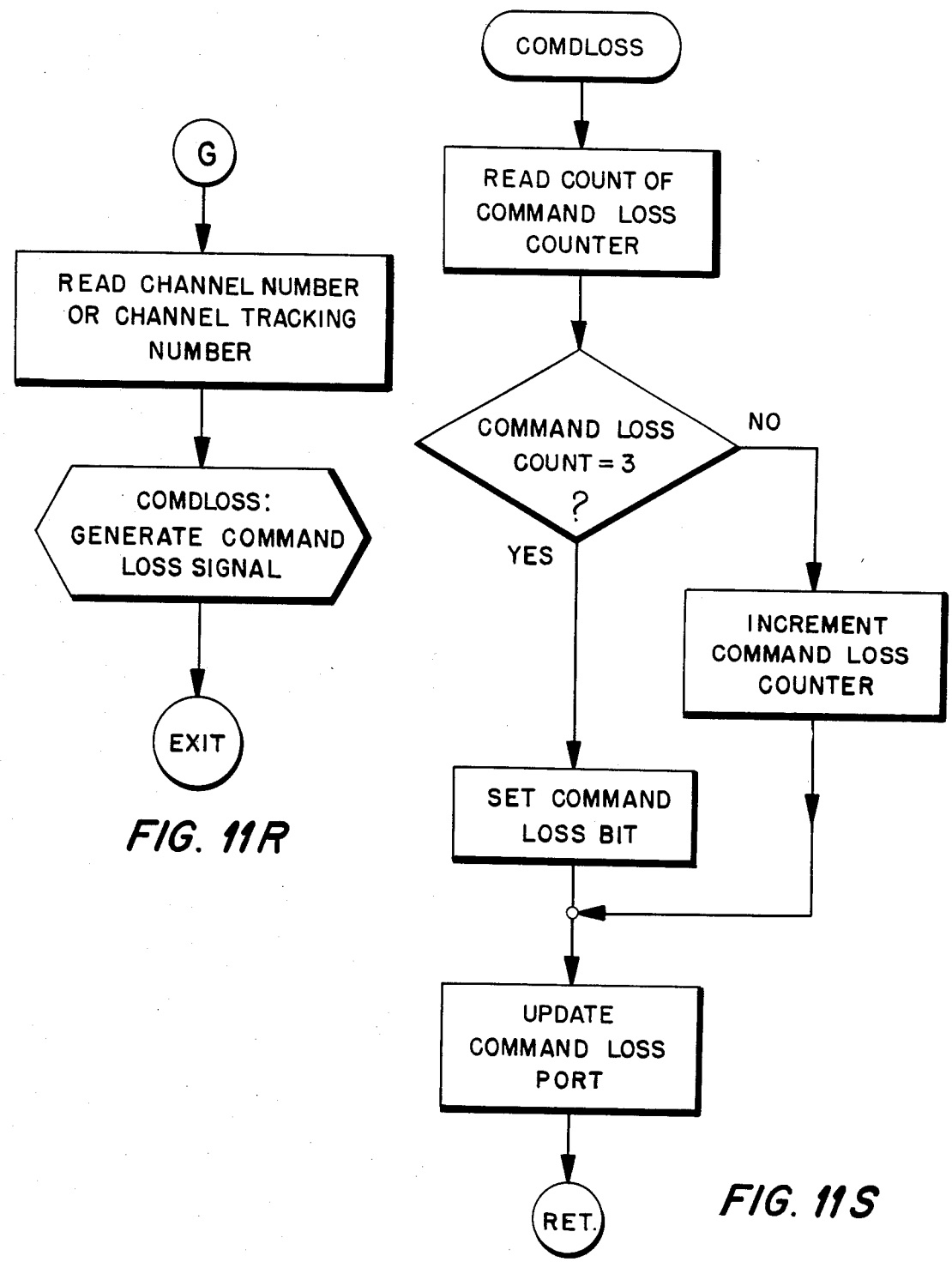

The valid data pulses for true proportional channels 1 through 4 are found in this module, shiown in FIG. 11N. The program searches for a valid data pulse by reading pulses from interference memories and checking the interference count for those pulses which are within the data window. It eliminates not only pulses which are outside the data window but also those pulses which have an interference count greater than 4. Any pulses remaining will be further verified with data pulses of the corresponding complementary channel. For example, data pulses of channel 1 are compared with those of channel 13, channel 2 with channel 14, and so forth. If the data indicated by a data pulse of a true proportional channel is equal to the data indicated by the corresponding complemented data pulse, the program will consider this data pulse as a possible valid data pulse. After verifying all remaining data pulses of the particular true proportional channel, the number of possible valid data pulses is examined. If exactly one possible valid data pulse exists, the program will consider this as the valid data pulse and execute the output subroutine PROPOUTP to output it. Zero, or more than one, possible valid data pulses will cause the program to ignore the uplink command and execute the subroutine COMDLOSS.

F. PCSEARCH

This module, illustrated in FIG. 11O, is used to search for data pulses for complementary proportional channels 13 through 16. The data pulse contained in each complementary proportional channel indicates the complemented data of the corresponding true proportional channel. Because of this, the complementary proportional channel pulses are used to confirm the true proportional channel pulses. The program reads pulses from interference memories and examines the interference count of those pulses which are within the data window. Data pulses with interference counts greater than 4 in either of their dual interference windows are eliminated. The data pulses remaining will be stored in data buffers, instead of being output to an output port, and used to verify the pulses of corresponding true proportional channels. There is no output for complementary proportional channels.

G. Output

This module comprises three subroutines which are listed in the Table 4 with their functions.

TABLE 4

| OUTPUT SUBROUTINES | |
|---|---|
| SUBROUTINE | FUNCTION |
| DISCOUTP | Perform discrete smoothing, update discretes, output smoothed discretes, and reset command loss counter. |
| PROPOUTP | Convert 10-bit valid data to 12-bit data, output it, and reset command loss counter. |
| COMDLOSS | Keep track of command loss counters and generate command loss signal. |

In this module, valid data pulses found in modules DDSRCH and PDSEARCH will be output. For discrete channels subroutine DISCOUTP is used to perform up to four stages of discrete smoothing, to update discretes, and to output smoothed discretes. With four stages of smoothing, a given discrete channel is held in its present state until four consecutive updates having the same value have been received and decoded. For true proportional channels, the valid data is converted to 12-bit data in order to be compatible with the decoder hardware's D/A converter. The converted data is then output to the output port. Proportional data conversion and output are performed by executing subroutine PROPOUTP. At the end of both subroutines DISCOUTP and PROPOUTP, the command loss counter for the specified channel is reset because of receipt of a valid uplink command for this channel number. Subroutine COMDLOSS, also a part of this module, is used to generate the command loss signal if, for three consecutive PRI's, invalid decoding for a given channel occurs. The flowchart for this module is shown in FIGS. 11P, 11Q, 11R and 11S.

We claim:

1. A method of identifying possible data pulses in a position-coded pulse train in the presence of synchronous interference, said method comprising the steps of:
    establishing a data pulse window;
    dividing the data pulse window into a first set of contiguous interference windows and a second set of contiguous interference windows, the second set overlapping the first set;
    storing a first interference count for each pulse occurring within a window of the first set of interference windows and a second interference count for said pulse occurring within a window of the second set of interference windows, said interference counts representing the frequency of occurrence of pulses in each interference window of said sets;
    eliminating all pulses for which at least one of the two interference counts exceeds a predetermined maximum; and
    identifying the remaining pulses as possible data pulses.

2. A method of identifying possible data pulses in a plurality of position-coded pulse trains in the presence of synchronous interference, said method comprising the steps of:
    establishing an enabling signal window during a period representing a predicted occurrence of each of said pulse trains;
    storing the arrival time of each pulse arriving during the period of said enabling signal window;

dividing said enabling signal window into at least one set of contiguous interference windows;
storing, for each interference window, an interference count representing the frequency of occurrence of pulses in that interference window;
eliminating all pulses for which the stored arrival time is not within predetermined maximum and minimum data pulse limits;
eliminating all pulses for which the stored interference count exceeds a predetermined maximum; and
identifying the remaining pulses as possible data pulses.

* * * * *